US012453725B2

(12) United States Patent
Cook et al.

(10) Patent No.: US 12,453,725 B2
(45) Date of Patent: Oct. 28, 2025

(54) TREATMENT OF INFLAMMATORY DISEASE

(71) Applicant: Celleron Therapeutics Limited, Oxford (GB)

(72) Inventors: Simon Cook, Oxford (GB); David Kerr, Oxford (GB); Nicholas La Thangue, Oxford (GB)

(73) Assignee: Celleron Therapeutics Limited, Oxford (GB)

( * ) Notice: Subject to any disclaimer, the term of this patent is extended or adjusted under 35 U.S.C. 154(b) by 845 days.

(21) Appl. No.: 17/763,405

(22) PCT Filed: Sep. 25, 2020

(86) PCT No.: PCT/GB2020/052329
§ 371 (c)(1),
(2) Date: Mar. 24, 2022

(87) PCT Pub. No.: WO2021/058974
PCT Pub. Date: Apr. 1, 2021

(65) Prior Publication Data
US 2022/0347164 A1 Nov. 3, 2022

(30) Foreign Application Priority Data
Sep. 27, 2019 (GB) .................................. 1913988

(51) Int. Cl.
*A61K 31/454* (2006.01)
*A61K 39/00* (2006.01)
*A61K 39/395* (2006.01)
*A61P 29/00* (2006.01)

(52) U.S. Cl.
CPC ........ *A61K 31/454* (2013.01); *A61K 39/3955* (2013.01); *A61P 29/00* (2018.01); *A61K 2039/505* (2013.01)

(58) Field of Classification Search
CPC .... A61K 31/454; A61K 39/3955; A61P 29/00
See application file for complete search history.

(56) References Cited

U.S. PATENT DOCUMENTS 8,207,202 B2 * 6/2012 Andrews ................. A61P 35/04
514/326
2022/0347164 A1 11/2022 Cook et al.

FOREIGN PATENT DOCUMENTS

| CN | 109758484 A | 5/2019 |
|---|---|---|
| WO | WO-2007/045844 A1 | 4/2007 |
| WO | WO-2017/165778 A1 | 9/2017 |
| WO | WO-2018/169887 A1 | 9/2018 |
| WO | WO-2019/072220 A1 | 4/2019 |
| WO | WO-2021/058974 A1 | 4/2021 |

OTHER PUBLICATIONS

Celleron Therapeutics, "Celleron Therapeutics CXD101 and nivolumab combination therapy CAROSELL clears initial Phase II clinical trial efficacy hurdle in MSS CRC patients," Cellerontherageutics.com: 6 pages (Published Apr. 16, 2019).
Celleron Therapeutics., "Celleron Therapeutics Data Committee approves continuation of CXD101 and nivolumab combination therapy CAROSELL Phase II clinical trial in MSS CRC patients," Cellerontherapeutics.com: 7 pages (Published Jun. 17, 2019).
Clinical Trial NCT03993626; "A Trial of CXD101 in Combination With Nivolumab in Patients With Metastatic Microsatellite-Stable Colorectal Cancer (CAROSELL)," U.S. National Library of Medicine: 9 pages (2019).
International Search Report and Written Opinion for International Application No. PCT/GB2020/052329 dated Jan. 11, 2021.
Saunders et al., "A phase Ib/ II trial to assess the safety and efficacy of CXD101 in combination with the PD-1 inhibitor nivolumab in patients with metastatic, previously-treated, microsatellite-stable (MSS) colorectal carcinoma (short title CAROSELL)," Annals o Oncology, 30: p. v250 (2019).
Turkes et al., "Targeting the immune milieu in gastrointestinal cancers," Journal of Gastroenterology, 55(10): 909-926 (2020).
United Kingdom Search Report for Application No. GB1913988.0 dated Mar. 11, 2020.
"Celleron Therapeutics Begins a Pioneering Combination Therapy Approach to Treating Colorectal Cancer", https://cellerontherapeutics.com/celleron-therapeutics-begins-a-pioneering-combination-therapy-approach-to-treating-colorectal-cancer, 4 pages (2018).
Adis International Ltd., "drug profile CXD101" Adis Insight, Mar. 5, 2020.
Bolden et al., "Anticancer activities of histone deacetylase inhibitors." *Nature reviews Drug discovery* 5, 9 (2006): 769-784.
Cellerontheraputics.com, "Celleron Therapeutics to present CXD101 and nivolumab combination therapy Phase II clinical trial (CAROSELL) at ESMO 2019" 3 pages (Aug. 2019).
"A Study of CXD101 in Combination With Pembrolizumab for Relapsed or Refractory Diffuse Large B-Cell Lymphoma (PLACARD)" US National Library of Medicine, 9 pages (2020) https://clinicaltrials.gov/ct2/show/NCT03873025.
Dougan, "Checkpoint blockade toxicity and immune homeostasis in the gastrointestinal tract." *Frontiers in immunology* 8, 1547, (2017):1-8.
Dunn et al., "Epigenetics and immunotherapy: the current state of play." *Molecular immunology* 87 (2017): 227-239.
Fraga et al., "Loss of acetylation at Lys16 and trimethylation at Lys20 of histone H4 is a common hallmark of human cancer." *Nature genetics* 37, 4 (2005): 391-400.
Fraga et al., "Towards the human cancer epigenome: a first draft of histone modifications." *Cell Cycle* 4.10 (2005): 1377-1381.
Garber et al., "HDAC inhibitors overcome first hurdle." *Nature Biotechnology* 25,1 (2007): 17-19.
Glozak et al., "Acetylation and deacetylation of non-histone proteins." *Gene* 363 (2005): 15-23.
Seligson et al., "Global histone modification patterns predict risk of prostate cancer recurrence." *Nature* 435,7046 (2005): 1262-1266.

(Continued)

*Primary Examiner* — Kamal A Saeed
(74) *Attorney, Agent, or Firm* — Foley Hoag LLP; David P. Halstead; Alexander J. Chatterley

(57) ABSTRACT

The present invention relates to N-(2-aminophenyl)-4-(1-[(1,3-dimethyl-1H-pyrazol-4-yl)methyl]piperidin-4-yl)benzamide (CXD101), or a pharmaceutically acceptable salt thereof, for use as an anti-inflammatory agent, in particular for use in the treatment of immune checkpoint inhibitor-induced colitis.

19 Claims, 13 Drawing Sheets

(56) References Cited

OTHER PUBLICATIONS

Kobayashi et al., "Ulcerative colitis (primer)." Nature Reviews: Disease Primers 6.1 (2020): 74.
Som et al., "Immune checkpoint inhibitor-induced colitis: a comprehensive review." World journal of clinical cases 7.4 (2019): 405.

* cited by examiner

TREATMENT OF INFLAMMATORY DISEASE

RELATED APPLICATIONS

This Application is a U.S. National-stage filing under 35 U.S.C. § 371 of PCT Application No. PCT/GB2020/052329, filed Sep. 25, 2020, which claims the benefit of priority from GB Application No. 1913988.0 filed on Sep. 27, 2019 in the United Kingdom. The entire contents of the International Patent Application are incorporated herein in their entirety.

FIELD OF THE INVENTION

The present invention relates to a novel approach for the treatment and/or prevention of inflammatory bowel disease, in particular the treatment or prevention of immune checkpoint inhibitor-induced inflammatory bowel disease/colitis.

BACKGROUND OF THE INVENTION

Cancer is caused by uncontrolled and unregulated cellular proliferation. Precisely what causes a cell to become malignant and proliferate in an uncontrolled and unregulated manner has been the focus of intense research over recent decades. This research has led to the identification of a number of molecular targets and key metabolic pathways that are known to be associated with malignancy.

Despite numerous advances in the treatment of cancer, there remains a need for new therapies that provide improved therapeutic outcomes.

Immune checkpoint proteins present on immune cells and/or cancer cells [e.g. CTLA4 (also known as cytotoxic T-lymphocyte-associated protein 4 and CD152), LAG3 (also known as lymphocyte-activation gene 3 and CD223), PD1 (also known as programmed cell death protein 1 and CD279) and PD-L1 (also known as programmed death-ligand 1 and CD274)] are molecular targets that have been found to play an important role in regulating anti-tumour immune responses. Inhibitors of these immune checkpoint proteins (e.g. CTLA4, LAG3, PD1 and/or PD-L1 inhibitors) promote an anti-tumour immune response that can be utilised to effectively treat certain forms of cancer.

However, one major drawback with immune checkpoint inhibitor therapy is the occurrence of debilitating gastrointestinal side effects, in particular immune checkpoint inhibitor-induced inflammatory bowel disease or colitis.

Immune Checkpoint Inhibitor-Induced Colitis

In 2019, Som et al (Immune checkpoint inhibitor-induced colitis: A comprehensive review World J Clin Cases, 2019, 26; 7(4): 405-418) reviewed the association of immune check-point inhibitor (ICI) therapies with the evolution of immune-mediated colitis (IMC). Although clinically useful against many types of malignancy, many immune-related adverse events have also been related to ICIs. This is due to the immune system becoming less suppressed, affecting various organs including the gastrointestinal tract, where the result is diarrhoea and colitis. IMC typically occurs between 5 and 10 weeks after the 2nd or 3rd dose of ICI treatment. The incidence of immune-mediated colitis ranges from 1%-25% depending on the type of ICI and whether the ICI is used as part of a combination therapy. Endoscopically and histologically there is a significant overlap between IMC and inflammatory bowel disease, however more neutrophilic inflammation without chronic inflammation is usually present in IMC.

Mechanisms of IMC are not fully understood. However, CTLA-4 blockade removes CTLA4-mediated protection from autoimmunity and is thought to be responsible for a large spectrum of autoimmune-side effects. Immune-related toxicities are mostly associated with the inflammatory reaction produced by immune system responses against specific organs and tissues. Immune-related T-cell activation leads to the secretion of high levels of CD4 T-helper cell cytokines and cytolytic CD8 T-cell tissue infiltration. Another potential mechanism for generating colitis following anti-CTLA4 antibody involves CD25+CD4+ regulatory T cells (Treg). These immunosuppressive regulatory cells constitutively express high levels of CTLA-4 and data show increased autoimmune diseases in mice lacking Treg cells. Consequently, it has been hypothesized that an antibody to CTLA4 might diminish Treg cells and induce autoimmunity.

The enterocolitis related to ipilimumab has features similar to graft-versus-host disease. It has been proposed that a contributing factor to enterocolitis in this setting may be intestinal microflora and bacterial antigens, representing an area of future research for prophylaxis of enterocolitis in patients treated with ipilimumab.

Diarrhoea and enterocolitis lie along a clinical spectrum where diarrhoea is defined as increased stool frequency, and enterocolitis is defined as abdominal pain, rectal bleeding or the presence of mucus in stools with either clinical or radiologic objective evidence of entero-colonic inflammation, as defined by the American Society of Clinical Oncology (ASCO). The presence of enterocolitis increases the risk of other complications, including ileus, colonic distension, and toxic megacolon, intestinal perforation, or even death. The clinical severity of both diarrhoea and colitis is graded according to the National Cancer Institute's Common Terminology Criteria for Adverse Events. Mild diarrhoea (grade 1) is defined as less than 4 stools per day above baseline. Grade 2 diarrhoea is defined as 4 to 6 stools per day above baseline, while grade 2 colitis is characterized by abdominal pain or blood or mucus in the stool. Severe diarrhoea (grade 3) is defined as 7 stools per day above baseline, and grade 3 colitis is defined by the presence of peritoneal signs with ileus and fever consistent with bowel perforation. A grade 4 designation is distinct from grade 3, reflecting increased severity and the life-threatening nature of symptoms.

More than two-thirds of patients who receive anti-CTLA-4 therapy develop an adverse event, and one-third of patients who are treated with anti-CTLA-4 therapy experience adverse events of the gastrointestinal tract, such as aphthous ulcers, esophagitis, gastritis, and enterocolitis, which usually presents as diarrhoea. The incidence of diarrhoea is higher in patients receiving anti-CTLA-4 agents, such as ipilimumab, compared to patients receiving anti-PD-1/PD-L1 agents, such as nivolumab or pembrolizumab, with grade 3/4 diarrhoea seen in 10% vs 1%-2% of patients, respectively.

Beck et al. (Enterocolitis in patients with cancer after antibody blockade of cytotoxic T-lymphocyte-associated antigen 4. J Clin Oncol. 2006; 24:2283-2289) showed that enterocolitis, defined by the presence of grade 3 or 4 symptoms and/or proven by biopsy, was the most common adverse event associated with ipilimumab use, occurring in 21% of treated melanoma patients. Kwon et al. (Ipilimumab versus placebo after radiotherapy in patients with metastatic castration-resistant prostate cancer that had progressed after docetaxel chemotherapy (CA184-043): a multicentre, randomised, double-blind, phase 3 trial. Lancet Oncol; 2014, 15:700-712) reported a 5% incidence of grade 3/4 colitis among patients with prostate cancer who were treated with ipilimumab at the dose of 10 mg/kg. Slovin et al. (Ipilimumab alone or in combination with radiotherapy in metastatic castration-resistant prostate cancer: results from an open-label, multicenter phase I/II study. Ann Oncol. 2013; 24:1813-1821) demonstrated that the incidence of grade 3/4 colitis increased from 13% to 16% with an increase in the dose of ipilimumab from 5 mg/kg to 10 mg/kg in patients with prostate cancer. Similarly, the incidence of enterocolitis in patients with renal cell carcinoma receiving higher doses of ipilimumab was 35% compared to 14% in patients receiving lower doses.

Overall, the risk of severe grade adverse events increased from 7% to 25% with an increase in the dose of ipilimumab from 3 mg/kg to 10 mg/kg. Most of the increase in adverse effects was due to an increase in the episodes of diarrhoea. However, the toxicity profile would not increase if the dosage of nivolumab or pembrolizumab were increased from FDA approved doses (2 mg/kg every 3 wks) to higher doses (10 mg/kg every 2 wks or 3 wks). It may be argued that toxicities due to anti-CTLA-4 antibodies are dose-dependent whereas toxicities with anti-PD-1/anti-PD-L1 antibodies are perhaps independent of a dose-related effect.

Combination therapies have so far only been approved for metastatic melanoma. Use of combined anti-CTLA4 and anti PD-1 agents results in increased frequency and severity of diarrhoea and colitis than with the use of either agent alone. They can also cause rarer forms of toxicities like pancreatitis and small bowel enteritis which warrants discontinuation of ICI treatment and initiation of immunosuppressive therapy.

Therefore, there is a need to identify new therapeutic strategies that can be used to effectively treat cancers susceptible to immune checkpoint inhibition, while also minimising the occurrence of debilitating gastro-intestinal side effects, in particular the occurrence of immune checkpoint-induced inflammatory bowel disease/colitis.

The present invention was devised with the foregoing in mind.

SUMMARY OF THE INVENTION

The present invention resides in the surprising observation that the occurrence of immune checkpoint inhibitor-induced colitis is prevented when an immune checkpoint inhibitor is administered in combination with a particular HDAC inhibitor compound, namely N-(2-aminophenyl)-4-(1-[(1,3-dimethyl-1H-pyrazol-4-yl)methyl]piperidin-4-yl)benzamide (CXD101).

CXD101 is a Class 1 HDAC inhibitor undergoing clinical development in combination with immune checkpoint inhibitors, such as nivolumab, for the treatment of cancer. As discussed above, it is well recognised that all classes of immune checkpoint inhibitor cause immune-mediated colitis. In the case of nivolumab this occurs in 13% of patients. In a Phase Ib/II cancer clinical trial (CTL-101-023) in which CXD101 was combined with standard nivolumab therapy, no cases of colitis were reported (n=55). Further details of this study are provided in the example section of this application. Without wishing to be bound by any particular theory, it is postulated that the improved safety profile seen in this study (CTL-101-023) is the product of an anti-inflammatory action of the HDAC inhibitor, CXD101, providing colon mural protection versus the immune activity of nivolumab.

Thus, in one aspect the present invention relates to N-(2-aminophenyl)-4-(1-[(1,3-dimethyl-1H-pyrazol-4-yl)methyl]piperidin-4-yl)benzamide (CXD101), or a pharmaceutically acceptable salt thereof, for use in the prevention or treatment of immune checkpoint inhibitor-induced colitis.

In another aspect, the present invention relates to the use of N-(2-aminophenyl)-4-(1-[(1,3-dimethyl-1H-pyrazol-4-yl)methyl]piperidin-4-yl)benzamide (CXD101), or a pharmaceutically acceptable salt thereof, in the manufacture of a medicament for use in the prevention or treatment of immune checkpoint inhibitor-induced colitis.

In another aspect, the present invention relates to a method of preventing or treating immune checkpoint inhibitor-induced colitis, the method comprising administering a therapeutically effective amount of N-(2-aminophenyl)-4-(1-[(1,3-dimethyl-1H-pyrazol-4-yl)methyl]piperidin-4-yl)benzamide (CXD101), or a pharmaceutically acceptable salt thereof, to a patient receiving therapy with an immune checkpoint inhibitor.

The present invention also relates to N-(2-aminophenyl)-4-(1-[(1,3-dimethyl-1H-pyrazol-4-yl)methyl]piperidin-4-yl)benzamide (CXD101), or a pharmaceutically acceptable salt thereof, for use as an anti-inflammatory agent. Suitably, CXD101 is for use as an anti-inflammatory agent for the prevention or treatment of immune checkpoint inhibitor-induced colitis.

In another aspect, the present invention relates to the use of N-(2-aminophenyl)-4-(1-[(1,3-dimethyl-1H-pyrazol-4-yl)methyl]piperidin-4-yl)benzamide (CXD101), or a pharmaceutically acceptable salt thereof, in the manufacture of a medicament for use as an anti-inflammatory agent. Suitably, CXD101 is for use as an anti-inflammatory agent for the prevention or treatment of immune checkpoint inhibitor-induced colitis.

In another aspect, the present invention relates to a method of providing an anti-inflammatory effect, the method comprising administering a therapeutically effective amount of N-(2-aminophenyl)-4-(1-[(1,3-dimethyl-1H-pyrazol-4-yl)methyl]piperidin-4-yl)benzamide (CXD101), or a pharmaceutically acceptable salt thereof. Suitably, CXD101 provides an anti-inflammatory effect for the prevention or treatment of immune checkpoint inhibitor-induced colitis in subjects receiving therapy with an immune checkpoint inhibitor.

In another aspect, the present invention relates to N-(2-aminophenyl)-4-(1-[(1,3-dimethyl-1H-pyrazol-4-yl)methyl]piperidin-4-yl)benzamide (CXD101), or a pharmaceutically acceptable salt thereof, for use in the prevention or treatment of immune checkpoint inhibitor-induced colitis, wherein the N-(2-aminophenyl)-4-(1-[(1,3-dimethyl-1H-pyrazol-4-yl)methyl]piperidin-4-yl)benzamide (CXD101), or a pharmaceutically acceptable salt thereof, is administered simultaneously, separately or sequentially with an immune checkpoint inhibitor, or a pharmaceutically acceptable salt thereof.

In another aspect, the present invention relates to the use of N-(2-aminophenyl)-4-(1-[(1,3-dimethyl-1H-pyrazol-4-yl)methyl]piperidin-4-yl)benzamide (CXD101), or a pharmaceutically acceptable salt thereof, in the manufacture of a medicament for use in the prevention or treatment of immune checkpoint inhibitor-induced colitis, wherein the N-(2-aminophenyl)-4-(1-[(1,3-dimethyl-1H-pyrazol-4-yl)methyl]piperidin-4-yl)benzamide (CXD101), or a pharmaceutically acceptable salt thereof, is administered simultaneously, separately or sequentially with an immune checkpoint inhibitor, or a pharmaceutically acceptable salt thereof.

In another aspect, the present invention relates to a method of preventing or treating of immune checkpoint inhibitor-induced colitis, the method comprising administering a therapeutically effective amount of N-(2-aminophenyl)-4-(1-[(1,3-dimethyl-1H-pyrazol-4-yl)methyl]piperidin-4-yl)benzamide (CXD101), or a pharmaceutically acceptable salt thereof, to a patient receiving therapy with an immune-oncology agent, or a pharmaceutically acceptable salt thereof, and wherein the N-(2-aminophenyl)-4-(1-[(1,3-dimethyl-1H-pyrazol-4-yl)methyl]piperidin-4-yl)benzamide (CXD101), or a pharmaceutically acceptable salt thereof, is administered simultaneously, separately or sequentially with an immune checkpoint inhibitor.

In another aspect, the present invention relates to a combination for use in the prevention or treatment of immune checkpoint inhibitor-induced colitis, the combination comprising N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor, or a pharmaceutically acceptable salt thereof.

In another aspect the present invention relates to a pharmaceutical product for use in the prevention or treatment of immune checkpoint inhibitor-induced colitis comprising a combination as defined herein.

In another aspect, the present invention relates to a pharmaceutical composition for use in the prevention or treatment of immune checkpoint inhibitor-induced colitis comprising a combination as defined herein, and one or more pharmaceutically acceptable excipients.

In any of the above-outlined aspects of the invention, N-(2-aminophenyl)-4-(1-[(1,3-dimethyl-1H-pyrazol-4-yl) methyl]piperidin-4-yl)benzamide (CXD101), or a pharmaceutically acceptable salt thereof, is suitably for use in the prevention or treatment of immune checkpoint inhibitor-induced colitis by inducing neutropenia. Neutrophilic inflammation without chronic inflammation is typically present in immune checkpoint inhibitor-induced colitis. It is been discovered that treatment with CXD101 engenders a reduction in the number of neutrophils (e.g. tissue-associated neutrophils) that are able to drive the inflammation underpinning immune checkpoint inhibitor-induced colitis.

In another aspect, the present invention relates to N-(2-aminophenyl)-4-(1-[(1,3-dimethyl-1H-pyrazol-4-yl)methyl]piperidin-4-yl)benzamide (CXD101), or a pharmaceutically acceptable salt thereof, for use in inducing neutropenia in a subject suffering from immune checkpoint inhibitor-induced colitis.

In another aspect, the present invention relates to N-(2-aminophenyl)-4-(1-[(1,3-dimethyl-1H-pyrazol-4-yl)methyl] piperidin-4-yl)benzamide (CXD101), or a pharmaceutically acceptable salt thereof, for use in reducing the number of neutrophils (e.g. tissue-associated neutrophils) in a subject suffering from immune checkpoint inhibitor-induced colitis.

In another aspect, the present invention relates to N-(2-aminophenyl)-4-(1-[(1,3-dimethyl-1H-pyrazol-4-yl)methyl] piperidin-4-yl)benzamide (CXD101), or a pharmaceutically acceptable salt thereof, for use in inducing neutropenia in a subject receiving therapy with an immune checkpoint inhibitor.

In another aspect, the present invention relates to N-(2-aminophenyl)-4-(1-[(1,3-dimethyl-1H-pyrazol-4-yl)methyl] piperidin-4-yl)benzamide (CXD101), or a pharmaceutically acceptable salt thereof, for use in reducing the number of neutrophils (e.g. tissue-associated neutrophils) in a subject receiving therapy with an immune checkpoint inhibitor.

In another aspect, the present invention relates to N-(2-aminophenyl)-4-(1-[(1,3-dimethyl-1H-pyrazol-4-yl)methyl] piperidin-4-yl)benzamide (CXD101), or a pharmaceutically acceptable salt thereof, for use in the prevention or treatment of colitis.

Preferred, suitable, and optional features of any one particular aspect of the present invention described herein are also preferred, suitable, and optional features of any other aspect.

DETAILED DESCRIPTION OF THE INVENTION

Definitions

Unless otherwise stated, the following terms used in the specification and claims have the following meanings set out below.

It is to be appreciated that references to "treating" or "treatment" include prophylaxis as well as the alleviation of established symptoms of a condition. "Treating" or "treatment" of a state, disorder or condition therefore includes: (1) preventing or delaying the appearance of clinical symptoms of the state, disorder or condition developing in a human that may be afflicted with or predisposed to the state, disorder or condition but does not yet experience or display clinical or subclinical symptoms of the state, disorder or condition, (2) inhibiting the state, disorder or condition, i.e., arresting, reducing or delaying the development of the disease or a relapse thereof (in case of maintenance treatment) or at least one clinical or subclinical symptom thereof, or (3) relieving or attenuating the disease, i.e., causing regression of the state, disorder or condition or at least one of its clinical or subclinical symptoms.

A "therapeutically effective amount" means the amount of a compound that, when administered to a mammal for treating a disease, is sufficient to effect such treatment for the disease. The "therapeutically effective amount" will vary depending on the compound, the disease and its severity and the age, weight, etc., of the mammal to be treated.

An "inhibitor" may be a polypeptide, nucleic acid, carbohydrate, lipid, small molecular weight compound, an oligonucleotide, an oligopeptide, siRNA, antisense, a recombinant protein, an antibody, a peptibody, or conjugates or fusion proteins thereof. For a review of siRNA see Milhavet O, Gary D S, Mattson M P. (Pharmacol Rev. 2003 December; 55(4):629-48. For a review of antisense see Opalinska J B, Gewirtz A M. Sci STKE. 2003 Oct. 28; 2003 (206): p 47. A small molecular weight compound refers to a compound with a molecular weight of less than 2000 Daltons, less than 1000 Daltons, less than 700 Daltons or less than 500 Daltons.

References to "a pharmaceutically acceptable salt" of an inhibitor defined herein is refers to any salt form suitable for pharmaceutical use. Examples of pharmaceutically acceptable salts include an acid-addition salt of an inhibitor of the invention which is sufficiently basic, for example, an acid-addition salt with, for example, an inorganic or organic acid, for example hydrochloric, hydrobromic, sulfuric, phosphoric, trifluoracetic, formic, citric methane sulfonate or maleic acid. In addition, a suitable pharmaceutically acceptable salt of an inhibitor of the invention which is sufficiently acidic is an alkali metal salt, for example a sodium or potassium salt, an alkaline earth metal salt, for example a calcium or magnesium salt, an ammonium salt or a salt with an organic base which affords a pharmaceutically acceptable cation, for example a salt with methylamine, dimethylamine, trimethylamine, piperidine, morpholine or tris-(2-hydroxyethyl)amine.

References herein to N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor, or a pharmaceutically acceptable salt thereof, include, where appropriate, any isomeric, tautomeric, polymorphic, amorphous and solvate (e.g. hydrate) forms of these agents. An agent may also be administered in the form of a prodrug which is broken down in the human or animal body to release the active inhibitor. Examples of pro-drugs include in vivo cleavable ester derivatives of the inhibitors that may be formed at a carboxy group or a hydroxy group in an inhibitor compound and in-vivo cleavable amide derivatives that may be formed at a carboxy group or an amino group in an inhibitor compound. Various forms of pro-drug have been described, for example in the following documents:— a) Methods in Enzymology, Vol. 42, p. 309-396, edited by K. Widder, et al. (Academic Press, 1985);
b) Design of Pro-drugs, edited by H. Bundgaard, (Elsevier, 1985);
c) A Textbook of Drug Design and Development, edited by Krogsgaard-Larsen and H. Bundgaard, Chapter 5 "Design and Application of Pro-drugs", by H. Bundgaard p. 113-191 (1991);
d) H. Bundgaard, Advanced Drug Delivery Reviews, 8, 1-38 (1992);
e) H. Bundgaard, et al., Journal of Pharmaceutical Sciences, 77, 285 (1988);
f) N. Kakeya, et al., Chem. Pharm. Bull., 32, 692 (1984);
g) T. Higuchi and V. Stella, "Pro-Drugs as Novel Delivery Systems", A.C.S. Symposium Series, Volume 14; and
h) E. Roche (editor), "Bioreversible Carriers in Drug Design", Pergamon Press, 1987.

References herein to the N-(2-aminophenyl)-4-(1-[(1,3-dimethyl-1H-pyrazol-4-yl)methyl]piperidin-4-yl)benzamide (CXD101), or a pharmaceutically acceptable salt thereof, being administered "in combination with" an immune checkpoint inhibitor (e.g. a CTLA4, LAG3, PD1 or PD-L1 inhibitor) or a pharmaceutically acceptable salt thereof, or vice versa, unless otherwise stated otherwise, include the inhibitors being administered sequentially, separately or simultaneously with one another.

As used herein "simultaneous administration" refers to therapy in which the both agents (e.g. N-(2-aminophenyl)-4-(1-[(1,3-dimethyl-1H-pyrazol-4-yl)methyl]piperidin-4-yl)benzamide (CXD101), or a pharmaceutically acceptable salt thereof, and immune checkpoint inhibitor) are administered at the same time, suitably as a mono-therapy.

As used herein "sequential administration" means that one agent is administered after the other, however, the time period between the administration of each agent is such that both agents are capable of acting therapeutically concurrently. Thus, administration "sequentially" may permit one agent to be administered within seconds, minutes, or a matter of hours after the other provided the circulatory half-life of the first administered agent is such that they are both concurrently present in therapeutically effective amounts. The time delay between the administration of the agents may vary depending on the exact nature of the agents, the interaction there between, and their respective half-lives.

As used herein, "separate administration" means that one agent is administered after the other, however, the time period between administration is such that the first administered agent is no longer present a therapeutically effective amount when the second agent is administered. Accordingly, the two agents exert their therapeutic effects separately. Nevertheless, the overall therapeutic effect observed when the two agents separately act therapeutically may be greater than either agent used alone.

As used herein the, "subject(s)" and/or "patient(s)", suitably refer to mammals (e.g. humans and non-human mammals such as livestock (cows, sheep, goats) or companion animals (cats, dogs, horses, rabbits). Suitably, the subject(s) and/or patient(s) are human(s).

As used herein, a "pharmaceutical product" refers to a product comprising a pharmaceutical. For instance, examples of a pharmaceutical product include a medical device, a pharmaceutical composition and a kit of parts suitably comprising one or more devices, containers and/or pharmaceuticals.

CXD101 as a HDAC Inhibitor

CXD101 (previously known as AZD9468) is a Class I-selective histone deacetylase (HDAC) inhibitor with specificity for Class I isoforms HDAC1 (63 nM IC50), HDAC2 (570 nM IC50), and HDAC3 (550 nM IC50), and no activity (≥2500 nM) against HDAC Class 11.

CXD101 acts as an epigenetic immune-regulator that kills cancer cells by blocking histone-deacetylase mediated gene expression; and secondly reactivates the patient's immune system by increasing tumour expression of MHC I & II.

The chemical name of CXD101 is N-(2-aminophenyl)-4-(1-[(1,3-dimethyl-1H-pyrazol-4-yl)methyl]piperidin-4yl) benzamide. It has a molecular weight of 403.52, and formula C24H29N50. CXD101 is a white or off-white crystalline solid. It is dibasic with a pKas of 3.2 and 9. It displays pH-dependent solubility, with a solubility of 0.5 mg/mL to >20 mg/mL across the pH range 1 to 8 at 25° C. The melting point of CXD101 is approximately 172° C. The UV absorbance maxima are 199 and 229 nm.

The structure of CXD101 is shown below:

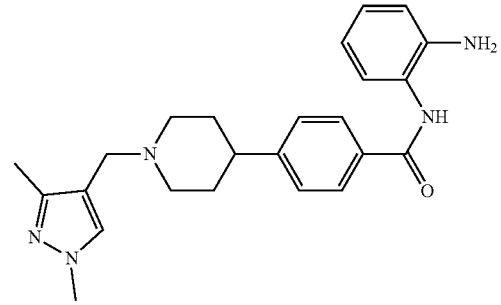 [SMILES: Cc1nn(C)cc1CN1CCC(c2ccc(C(=O)Nc3ccccc3N)cc2)CC1]

Immune Checkpoint Inhibitor

The immune system has an important role in recognizing and eliminating tumours. Transformed tumour cells express tumour-associated antigens (TAAs) that are not seen on normal cells. These TAAs are recognized by the immune system, and T cells can be stimulated in response to cellular presentation of TAAs. TAAs are presented along with the major histocompatibility complex (MHC) I or II by specialized antigen-presenting cells (APCs) that bind with T-cell receptors (TCRs). Activation of T cells requires a co-stimulatory signal which includes the interaction of TCR with MHC along with the interaction of CD-28 (stimulatory checkpoint expressed on T cells) with B7 (CD-80) present on APCs. This leads to T-cell proliferation, cytokine secretion, changes in gene expression and metabolism.

Tumours may use immune-checkpoint pathways as a mechanism of immune resistance, principally against T cells that are specific for TAAs. Two well-studied immune-checkpoint receptors are CTLA-4 (CD152) and programmed cell death protein 1 (PD-1 or CD279). CLTA-4 is a negative regulator of T-cell-mediated anti-tumour responses. Expression of CTLA-4 is up-regulated upon TCR stimulation. This molecule competes with CD28 for binding to B7 on APCs, avoiding the costimulatory signal and blunting T-cell activation and proliferation. PD-1 is also expressed on the surface of activated T cells. The interaction between PD-1 and programmed death ligand (PD-L1 and PD-L2), expressed on APCs, leads to T-cell inactivation. Additionally, PD-1 plays an important role to limit the activity of T cells in peripheral tissues through inflammatory response to infection and to limit autoimmunity.

Checkpoint inhibitors are monoclonal antibodies that block these pathways. To date there are 7 approved checkpoint inhibitors that target 3 main checkpoints, including cytotoxic T-lymphocyte associated protein 4 (CTLA-4; ipilimumab and tremelimumab), programmed cell death receptor 1 (PD-1; pembrolizumab and nivolumab), and programmed death ligand 1 (PD-L1; atezolizumab, avelumab, and durvalumab)

Any immune checkpoint inhibitor may be used in the combination therapy defined herein.

In one embodiment, the immune checkpoint inhibitor is selected from a PD1, PD-L1 inhibitor, a LAG3 inhibitor and a CTLA-4 inhibitor. In a particular embodiment, the immune checkpoint inhibitor is a PD1 or PD-L1 inhibitor.

PD-1 is a cell surface receptor protein present on T cells. PD-1 plays an important role in down-regulating the immune system and promoting self-tolerance by suppressing T cell inflammatory activity. The PD-1 protein is an immune checkpoint that guards against autoimmunity through a dual mechanism of promoting apoptosis (programmed cell death) in antigen specific T cells in lymph nodes, while simultaneously reducing apoptosis in regulatory T cells (anti-inflammatory suppressive T cells).

PD-1 therefore inhibits the immune system. This prevents autoimmune diseases, but it can also prevent the immune system from killing cancer cells.

PD1 binds two ligands, PD-L1 and PD-L2. PD-L1 is of particular interest as it is highly expressed in several cancers and hence the role of PD1 in cancer immune evasion is well established. Monoclonal antibodies targeting PD-1 that boost the immune system are being developed for the treatment of cancer. Many tumour cells express PD-L1, an immunosuppressive PD-1 ligand; inhibition of the interaction between PD-1 and PD-L1 can enhance T-cell responses in vitro and mediate preclinical antitumour activity. This is known as immune checkpoint blockade.

Examples of drugs that target PD-1 include pembrolizumab (Keytruda) and nivolumab (Opdivo). These drugs have been shown to be effective in treating several types of cancer, including melanoma of the skin, non-small cell lung cancer, kidney cancer, bladder cancer, head and neck cancers, and Hodgkin lymphoma. They are also being studied for use against many other types of cancer. Examples of drugs in development include BMS-936559 (Bristol Myers Squibb), MGA012 (MacroGenics) and MEDI-0680 (MedImmune).

Examples of drugs that inhibit PD-L1 include atezolizumab (Tecentriq), avelumab (Bavencio) and durvalumab (Imfinzi). These drugs have also been shown to be helpful in treating different types of cancer, including bladder cancer, non-small cell lung cancer, and Merkel cell skin cancer (Merkel cell carcinoma). They are also being studied for use against other types of cancer.

Examples of LAG3 inhibitors include BMS-986016/Relatlimab, TSR-033, REGN3767, MGD013 (bispecific DART binding PD-1 and LAG-3), GSK2831781 and LAG525.

Examples of CTLA-4 inhibitors include MDX-010/Ipilimumab, AGEN1884, and CP-675,206/Tremelimumab.

In one embodiment, the immune checkpoint inhibitor is selected from BMS-986016/Relatlimab, TSR-033, REGN3767, MGD013 (bispecific DART binding PD-1 and LAG-3), GSK2831781, LAG525, MDX-010/Ipilimumab, AGEN1884, and CP-675,206/Tremelimumab, pembrolizumab, nivolumab, atezolizumab, avelumab and durvalumab, or a pharmaceutically acceptable salt or solvate thereof.

In one embodiment, the immune checkpoint inhibitor is selected from BMS-986016/Relatlimab, MDX-010/Ipilimumab, CP-675,206/Tremelimumab, pembrolizumab, nivolumab, atezolizumab, avelumab, and durvalumab, or a pharmaceutically acceptable salt or solvate thereof.

In one embodiment, the immune checkpoint inhibitor is selected from pembrolizumab, nivolumab, atezolizumab, avelumab and durvalumab, or a pharmaceutically acceptable salt or solvate thereof.

In one embodiment, the immune checkpoint inhibitor is selected from pembrolizumab or nivolumab, or a pharmaceutically acceptable salt or solvate thereof.

Pembrolizumab

Pembrolizumab is a humanized IgG4 monoclonal antibody antibody used in cancer immunotherapy. It binds to the programmed cell death-1 receptor and blocks its interaction with ligands PD-L1 and PD-L2. The PD-1 receptor is a negative regulator of T-cell activity that has been shown to be involved in the control of T-cell immune responses. Pembrolizumab potentiates T-cell responses, including anti-tumour responses, through blockade of PD-1 binding to PD-L1 and PD-L2, which are expressed in antigen presenting cells and may be expressed by tumours or other cells in the tumour microenvironment. This includes to treat melanoma, lung cancer, head and neck cancer, Hodgkin lymphoma, and stomach cancer.

In 2017 the FDA approved it for use in any unresectable or metastatic solid tumour with mismatch repair deficiency or microsatellite instability.

Based on the safety results from the KEYNOTE studies, a number of important identified risks have been identified. Detailed prescribing guidance can be found in the Keytruda (INN pembrolizumab) SmPC, Merck Sharp & Dohme. The manufacturer provides guidance to prescribers in the management of these adverse drug reactions. Colitis is listed as a "common" GI side effect of pembrolizumab treatment.

Nivolumab

Nivolumab is a human monoclonal antibody that blocks the interaction between PD-1 and its ligands, PD-L1 and PD-L2. It is an IgG4 kappa immunoglobulin that has a calculated molecular mass of 146 kDa.

Binding of the ligands PD-L1 and PD-L2 to the T-cell PD-1 receptor inhibits T-cell proliferation and cytokine production. Upregulation of PD-1 ligands occurs in some tumours, and signaling through this pathway can contribute to inhibition of active T-cell immune surveillance of tumours. Nivolumab binds to the PD-1 receptor and blocks its interaction with PD-L1 and PD-L2, releasing PD-1 pathway-mediated inhibition of the immune response, including the anti-tumour immune response. In syngeneic mouse tumour models, blocking PD-1 activity resulted in decreased tumour growth.

Nivolumab has been licensed in the USA, based on efficacy, as a drug for use in patients with the following indications:

- BRAF V600 wild-type unresectable or metastatic melanoma, as a single agent.
- BRAF V600 mutation-positive unresectable or metastatic melanoma, as a single agent. This indication is approved under accelerated approval based on progression-free survival.
- Unresectable or metastatic melanoma, in combination with ipilimumab. This indication is approved under accelerated approval based on progression-free survival.
- Metastatic non-small cell lung cancer and progression on or after platinum-based chemotherapy. Patients with EGFR or ALK genomic tumour aberrations should have disease progression on FDA-approved therapy for these aberrations prior to receiving nivolumab.
- Advanced renal cell carcinoma who have received prior antiangiogenic therapy.
- Adult patients with classical Hodgkin lymphoma that has relapsed or progressed after: autologous hematopoietic stem cell transplantation (HSCT) and brentuximab vedotin; or 3 or more lines of systemic therapy that includes autologous HSCT. This indication is approved under accelerated approval based on overall response rate.
- Recurrent or metastatic squamous cell carcinoma of the head and neck with disease progression on or after a platinum-based therapy.
- Locally advanced or metastatic urothelial carcinoma who: have disease progression during or following platinum-containing chemotherapy; have disease progression within 12 months of neoadjuvant or adjuvant treatment with platinum-containing chemotherapy.
- Adult and paediatric (12 years and older) patients with MSI-H or dMMR metastatic colorectal cancer that has progressed following treatment with a fluoropyrimidine, oxaliplatin, and irinotecan.
- Use in MSI-H/dMMR colorectal carcinoma was approved by the FDA.

Based on the safety results from the CHECKMATE studies, a number of important identified risks with nivolumab treatment have been identified. Detailed prescribing guidance can be found in the Opdivo (INN nivolumab) SmPC, Bristol Myers Squibb. The manufacturer provides guidance to prescribers in the management of these adverse drug reactions. The key immune-related risks are shown in the table below:

| Nivolumab Important Identified Risks | |
| --- | --- |
| Risk Table | Description of Risk |
| Immune-related pneumonitis (lung inflammation resulting from activity of the immune system) | Nivolumab increases the risk of lung inflammation. In clinical trials, 3 patients in 100 developed lung inflammation, sometimes fatal. Signs or symptoms may include dry cough and shortness of breath. |
| Immune-related colitis (inflammation of the gut resulting from activity of the immune system) | Nivolumab increases the risk of diarrhoea or colitis. In nivolumab clinical trials, 13 patients in 100 developed diarrhoea or colitis. Signs and symptoms may include watery, loose or soft stools, an increased number of bowel movements, blood in stools or dark-coloured stools and pain or tenderness in the stomach area. |
| Immune-related hepatitis (liver inflammation resulting from activity of the immune system) | Nivolumab increases the risk of hepatitis. In nivolumab clinical trials, between 7 patients in 100 had abnormal liver tests. Signs and symptoms of hepatitis may include eye or skin yellowing (jaundice), pain on the right side of the stomach area and tiredness. |
| Immune-related nephritis (kidney inflammation) or kidney problems resulting from activity of the immune system | Nivolumab increases the risk of kidney inflammation. In nivolumab clinical trials, 3 patients in 100 developed kidney inflammation. Signs or symptoms may include production of smaller amounts of urine. |
| Immune-related endocrinopathies (problems with hormone producing organs resulting from activity of the immune system) | Nivolumab increases the risk of inflammation of hormone-producing glands (thyroid, adrenal, or pituitary glands) and may affect how these glands work. In nivolumab clinical trials, 10 patients in 100 developed disorders of hormone-producing glands. Signs or symptoms of endocrine gland problems may include headaches, tiredness and weight changes. |
| Immune-related rash | Nivolumab increases the risk of rash. In the clinical trials, between 26 patients in 100 developed rash. Signs or symptoms of severe skin reaction may include skin rash with or without itching, peeling of the skin, and dry skin. |
| Other immune-related adverse reactions | Other selected immune-related adverse reactions, which are uncommon but considered important identified risks, include uveitis (inflammation of the middle layer of the eye), vasculitisi, pancreatitis (inflammation of the pancreas), demyelination (loss of the protective layer surrounding certain nerve cells), Guillain-Barré syndrome (a nerve disorder that can result in pain, numbness muscle weakness and difficulty walking), pericardial disorders (includes pericarditis, pericardial effusion, cardiac tamponade, and Dressier's syndrome), myasthenic syndrome (another disorder resulting in muscle weakness), sarcoidosis and aseptic meningitis. These immune-related adverse reactions can be serious and life-threatening. |

-continued

| Nivolumab Important Identified Risks | |
|---|---|
| Risk Table | Description of Risk |
| Severe infusion reactions | Severe reactions to infusion (drip) of nivolumab into a vein were observed in clinical trials (5 patients in 100). Serious acute infusion reactions were infrequent. However, life-threatening reactions may occur. Signs or symptoms may include throat or chest tightness, wheezing, skin rash or hives, dizziness, or lightheadedness. |

Immune-related colitis (inflammation of the gut resulting from activity of the immune system) is listed as having a prevalence of 13% (13 patients out of every 100).

Combination Therapy

The present invention resides in the recognition that the HDAC inhibitor compound, N-(2-aminophenyl)-4-(1-[1,3-dimethyl-1H-pyrazol-4-yl)methyl]piperidin-4-yl)benzamide (CXD101), is particularly suited to use in combination with immune checkpoint inhibitors (e.g. CTLA4, LAG3, PD1 or PD-Li inhibitors).

As previously mentioned, immune checkpoint inhibitors are a class of anticancer agents that have shown great promise for the treatment of certain cancers. The inhibition of immune checkpoints results in the enhancement of the immune response to a tumour.

The inventors have surprisingly discovered that the HDAC inhibitor compound, N-(2-aminophenyl)-4-(1-[(1,3-dimethyl-1H-pyrazol-4-yl)methyl]piperidin-4-yl)benzamide (CXD101) can significantly potentiate the therapeutic effects of immune checkpoint inhibitors, thereby rendering the tumours more susceptible to immune checkpoint inhibition, and also significantly reduce or prevent the occurrence of immune checkpoint inhibitor-induced colitis.

Thus, the combination treatment of the present invention has the potential to provide better therapeutic outcomes in cancer patients, especially cancer patients that do not respond well to therapy with a HDAC inhibitor or an immune checkpoint inhibitor alone.

In one aspect, the present invention provides a combination comprising N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor, or a pharmaceutically acceptable salt thereof for use in the prevention or treatment of immune checkpoint inhibitor-induced colitis.

In another aspect, the present invention provides a pharmaceutical product comprising a combination of N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor, or a pharmaceutically acceptable salt thereof.

In one embodiment, the pharmaceutical product may comprise a kit of parts comprising separate formulations of N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor, or a pharmaceutically acceptable salt thereof. The separate formulations of N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor, or a pharmaceutically acceptable salt thereof, may be administered sequentially, separately and/or simultaneously.

In another embodiment the pharmaceutical product is a kit of parts which comprises:
a first container comprising N-(2-aminophenyl)-4-(1-[(1,3-dimethyl-1H-pyrazol-4-yl)methyl]piperidin-4-yl) benzamide (CXD101), or a pharmaceutically acceptable salt thereof, in association with a pharmaceutically acceptable adjuvant, diluent or carrier; and
a second container comprising an immune checkpoint inhibitor, or a pharmaceutically acceptable salt thereof, in association with a pharmaceutically acceptable adjuvant, diluent or carrier, and
a container means for containing said first and second containers.

In one embodiment, the pharmaceutical product may comprise a one or more unit dosage forms (e.g. vials, tablets or capsules in a blister pack). In one embodiment, each unit dose comprises only one agent selected from the N-(2-aminophenyl)-4-(1-[(1,3-dimethyl-1H-pyrazol-4-yl)methyl]piperidin-4-yl)benzamide (CXD101) compound and the immune checkpoint inhibitor. In another embodiment, the unit dosage form comprises both the N-(2-aminophenyl)-4-(1-[(1,3-dimethyl-1H-pyrazol-4-yl)methyl]piperidin-4-yl) benzamide (CXD101) compound and the immune checkpoint inhibitor.

Suitably, the CXD101 compound is administered orally and the immune checkpoint inhibitor is administered parenterally.

In one embodiment the pharmaceutical product or kit of parts further comprises means for facilitating compliance with a dosage regimen, for instance instructions detailing how to administer the combination.

In one embodiment, the pharmaceutical product or kit of parts further comprises instructions indicating that the combination, as defined herein, can be used in the treatment of cancer.

In one embodiment, the pharmaceutical product is a pharmaceutical composition.

Therapeutic Utility

N-(2-aminophenyl)-4-(1-[(1,3-dimethyl-1H-pyrazol-4-yl)methyl]piperidin-4-yl)benzamide (CXD101), or a pharmaceutically acceptable salt thereof, can be administered in combination with an immune checkpoint inhibitor to treat a proliferative disorder, such as cancer. In addition to potentiating the anti-cancer effect of the immune checkpoint inhibitor, N-(2-aminophenyl)-4-(1-[(1,3-dimethyl-1H-pyrazol-4-yl)methyl]piperidin-4-yl)benzamide (CXD101) also prevents or significantly reduces the occurrence of immune checkpoint inhibitor-induced colitis, which can be a debilitating adverse effect of immune checkpoint inhibitor therapy.

The present invention therefore relates to N-(2-aminophenyl)-4-(1-[(1,3-dimethyl-1H-pyrazol-4-yl)methyl]piperidin-4-yl)benzamide (CXD101), or a pharmaceutically acceptable salt thereof, for use in the prevention or treatment of immune checkpoint inhibitor-induced colitis.

In another aspect, the present invention relates to the use of N-(2-aminophenyl)-4-(1-[(1,3-dimethyl-1H-pyrazol-4-yl)methyl]piperidin-4-yl)benzamide (CXD101), or a pharmaceutically acceptable salt thereof, in the manufacture of a medicament for use in the prevention or treatment of immune checkpoint inhibitor-induced colitis.

In another aspect, the present invention relates to a method of preventing or treating immune checkpoint inhibitor-induced colitis, the method comprising administering a therapeutically effective amount of N-(2-aminophenyl)-4-(1-[(1,3-dimethyl-1H-pyrazol-4-yl)methyl]piperidin-4-yl)benzamide (CXD101), or a pharmaceutically acceptable salt thereof, to a patient receiving therapy with an immune checkpoint inhibitor.

The present invention also relates to N-(2-aminophenyl)-4-(1-[(1,3-dimethyl-1H-pyrazol-4-yl)methyl]piperidin-4-yl)benzamide (CXD101), or a pharmaceutically acceptable salt thereof, for use as an anti-inflammatory agent. Suitably, CXD101 is for use as an anti-inflammatory agent for the prevention or treatment of immune checkpoint inhibitor-induced colitis.

In another aspect, the present invention relates to the use of N-(2-aminophenyl)-4-(1-[(1,3-dimethyl-1H-pyrazol-4-yl)methyl]piperidin-4-yl)benzamide (CXD101), or a pharmaceutically acceptable salt thereof, in the manufacture of a medicament for use as an anti-inflammatory agent. Suitably, CXD101 is for use as an anti-inflammatory agent for the prevention or treatment of immune checkpoint inhibitor-induced colitis.

In another aspect, the present invention relates to a method of providing an anti-inflammatory effect, the method comprising administering a therapeutically effective amount of N-(2-aminophenyl)-4-(1-[(1,3-dimethyl-1H-pyrazol-4-yl)methyl]piperidin-4-yl)benzamide (CXD101), or a pharmaceutically acceptable salt thereof. Suitably, CXD101 provides an anti-inflammatory effect for the prevention or treatment of immune checkpoint inhibitor-induced colitis in subjects receiving therapy with an immune checkpoint inhibitor.

Thus, in one aspect, the present invention relates to a combination comprising N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor, or a pharmaceutically acceptable salt thereof, as defined herein for use in the treatment of a proliferative disorder and for use in the prevention or treatment of immune checkpoint inhibitor-induced colitis.

In another aspect, the present invention relates to a use of a combination comprising N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor as defined herein, or a pharmaceutically acceptable salt thereof, in the manufacture of a medicament for treating of a proliferative disorder and for use in the prevention or treatment of immune checkpoint inhibitor-induced colitis.

In another aspect, the present invention relates to a method of treating of a proliferative disorder in a subject in need thereof and for treating or preventing immune checkpoint inhibitor-induced colitis, the method comprising administering to said subject a combination comprising N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor as defined herein, or a pharmaceutically acceptable salt thereof.

In another aspect, the present invention relates to N-(2-aminophenyl)-4-(1-[(1,3-dimethyl-1H-pyrazol-4-yl)methyl]piperidin-4-yl)benzamide (CXD101), or a pharmaceutically acceptable salt thereof, as defined herein for use in the treatment of a proliferative disorder and for use in the prevention or treatment of immune checkpoint inhibitor-induced colitis, wherein the N-(2-aminophenyl)-4-(1-[(1,3-dimethyl-1H-pyrazol-4-yl)methyl]piperidin-4-yl)benzamide (CXD101), or a pharmaceutically acceptable salt thereof, is for simultaneous, separate or sequential administration with an immune checkpoint inhibitor, or a pharmaceutically acceptable salt thereof.

In another aspect, the present invention relates to an immune checkpoint inhibitor, or a pharmaceutically acceptable salt thereof, for use in the treatment of a proliferative disorder and for use in the prevention or treatment of immune checkpoint inhibitor-induced colitis, wherein the immune checkpoint inhibitor is for simultaneous, separate or sequential administration with N-(2-aminophenyl)-4-(1-[(1,3-dimethyl-1H-pyrazol-4-yl)methyl]piperidin-4-yl)benzamide (CXD101), or a pharmaceutically acceptable salt thereof.

In another aspect, the present invention relates to a use of N-(2-aminophenyl)-4-(1-[(1,3-dimethyl-1H-pyrazol-4-yl)methyl]piperidin-4-yl)benzamide (CXD101), or a pharmaceutically acceptable salt thereof, as defined herein in the manufacture of a medicament for treating a proliferative disorder and for use in the prevention or treatment of immune checkpoint inhibitor-induced colitis, wherein the medicament is for simultaneous, separate or sequential administration with an immune checkpoint inhibitor, or a pharmaceutically acceptable salt thereof.

In another aspect, the present invention relates to a use of an immune checkpoint inhibitor, or a pharmaceutically acceptable salt thereof, in the manufacture of a medicament for treating a proliferative disorder and for use in the prevention or treatment of immune checkpoint inhibitor-induced colitis, wherein the medicament is for simultaneous, separate or sequential administration with N-(2-aminophenyl)-4-(1-[(1,3-dimethyl-1H-pyrazol-4-yl)methyl]piperidin-4-yl)benzamide (CXD101).

Particularly suitably, N-(2-aminophenyl)-4-(1-[(1,3-dimethyl-1H-pyrazol-4-yl)methyl]piperidin-4-yl)benzamide (CXD101), or a pharmaceutically acceptable salt thereof, is for use in the prevention or treatment of immune checkpoint inhibitor-induced colitis by inducing neutropenia (i.e. reducing the number of neutrophils, such as tissue-associated neutrophils) in a subject. Neutrophilic inflammation without chronic inflammation is typically present in immune checkpoint inhibitor-induced colitis. It is been discovered that treatment with CXD101 engenders a reduction in the number of neutrophils (e.g. tissue-associated neutrophils) that are able to drive the inflammation underpinning immune checkpoint inhibitor-induced colitis.

In another aspect, the present invention relates to N-(2-aminophenyl)-4-(1-[(1,3-dimethyl-1H-pyrazol-4-yl)methyl]piperidin-4-yl)benzamide (CXD101), or a pharmaceutically acceptable salt thereof, for use in the prevention or treatment of colitis.

In another aspect, the present invention relates to a method of treating a proliferative disorder and treating or preventing immune checkpoint inhibitor-induced colitis, the method comprising administering to a subject in need thereof a therapeutically effective amount of N-(2-aminophenyl)-4-(1-[(1,3-dimethyl-1H-pyrazol-4-yl)methyl]piperidin-4-yl)benzamide (CXD101), or a pharmaceutically acceptable salt thereof, as defined herein and an immune checkpoint inhibitor, or a pharmaceutically acceptable salt thereof, either sequentially, separately or simultaneously.

The term "proliferative disorder" is used herein to refer to an unwanted, uncontrolled and abnormal cellular proliferation, such as, neoplastic or hyperplastic growth, whether in vitro or in vivo. Examples of proliferative conditions include, but are not limited to, benign, pre-malignant and malignant cellular proliferation, including but not limited to, malignant neoplasms and tumours, cancers, leukemias, psoriasis, bone diseases, fibroproliferative disorders (e.g., of connective tissues), and atherosclerosis. Any type of cell may be treated, including but not limited to, lung, colon, rectal, breast, ovarian, prostate, liver, pancreas, brain, bladder, kidney, bone, nerves and skin.

In an embodiment of the invention, the proliferative disorder is a benign disorder, such as, for example, neuroblastoma or fibrosis.

The anti-proliferative effects of the combination therapy of the present invention has particular application in the treatment of human cancers. In particular, the combination therapy of the present invention will be useful for treating any human cancer in which HDAC and/or immune checkpoint activity is implicated. This includes any cancer that has been unresponsive to therapy comprising either an immune checkpoint inhibitor, or a pharmaceutically acceptable salt thereof, or N-(2-aminophenyl)-4-(1-[(1,3-dimethyl-1H-pyrazol-4-yl)methyl]piperidin-4-yl)benzamide (CXD101).

In an embodiment of the invention, the anti-tumour effects of the combination therapy of the present invention has particular application in the treatment and/or prevention of a wide range of cancers including, but not limited to, non-solid tumours such as leukaemia, for example acute myeloid leukaemia, multiple myeloma, haematologic malignancies or lymphoma, and also solid tumours and their metastases such as melanoma, non-small cell lung cancer, glioma, hepatocellular (liver) carcinoma, glioblastoma, carcinoma of the thyroid, bile duct, bone, gastric, brain/CNS, head and neck, hepatic, stomach, prostate, breast, renal, testicular, ovarian, skin, cervical, lung, muscle, neuronal, oesophageal, bladder, lung, uterine, vulval, endometrial, kidney, colorectal, pancreatic, pleural/peritoneal membranes, salivary gland, and epidermoid tumours and haematological malignancies.

In one embodiment the cancer is selected from lung, colon, rectal, breast, ovarian, bladder, kidney, prostate, liver, pancreas, brain, bone, blood and skin cancer.

In one embodiment the cancer is a human cancer. Suitably, the human cancer is selected from lung, colon, breast, ovarian, bladder, kidney, prostate, liver, pancreas, brain, bone, blood and skin cancer. In one embodiment, the human cancer is selected from glioblastoma, lung cancer, breast cancer, renal cell carcinoma and Hodgkin lymphoma.

In one embodiment, the cancer may be any unresectable or metastatic solid tumour with mismatch repair deficiency or microsatellite instability.

In another embodiment, the cancer may be selected from one or more of the following:
  (i) BRAF V600 wild-type unresectable or metastatic melanoma;
  (ii) BRAF V600 mutation-positive unresectable or metastatic melanoma;
  (iii) unresectable or metastatic melanoma, in combination with ipilimumab;
  (iv) metastatic non-small cell lung cancer;
  (v) advanced renal cell carcinoma;
  (vi) classical Hodgkin lymphoma that has optionally relapsed or progressed after autologous hematopoietic stem cell transplantation (HSCT) and brentuximab vedotin;
  (vii) recurrent or metastatic squamous cell carcinoma of the head and neck;
  (viii) locally advanced or metastatic urothelial carcinoma; or
  (ix) MSI-H or dMMR colorectal cancer that has optionally progressed following treatment with a fluoropyrimidine, oxaliplatin, and irinotecan.

The anti-cancer effect may arise through one or more mechanisms, including but not limited to, the promotion of an antitumour immune response, the regulation of cell proliferation, the inhibition of angiogenesis (the formation of new blood vessels), the inhibition of metastasis (the spread of a tumour from its origin), the inhibition of invasion (the spread of tumour cells into neighbouring normal structures or within an organ), or the promotion of apoptosis (programmed cell death).

In a particular embodiment of the invention, the proliferative, metastatic and/or invasive condition to be treated is cancer. Suitably, the condition to be treated is highly invasive or metastatic cancer.

In another aspect, the present invention relates to a method of potentiating the effect of an immune checkpoint inhibitor, or a pharmaceutically acceptable salt thereof, the method comprising administering the immune checkpoint inhibitor separately, sequentially or simultaneously with N-(2-aminophenyl)-4-(1-[(1,3-dimethyl-1H-pyrazol-4-yl)methyl]piperidin-4-yl)benzamide (CXD101), or a pharmaceutically acceptable salt thereof, as defined herein.

In another aspect, the present invention relates to a method of potentiating the effect of N-(2-aminophenyl)-4-(1-[(1,3-dimethyl-1H-pyrazol-4-yl)methyl]piperidin-4-yl)benzamide (CXD101), or a pharmaceutically acceptable salt thereof, as defined herein, the method comprising administering the N-(2-aminophenyl)-4-(1-[(1,3-dimethyl-1H-pyrazol-4-yl)methyl]piperidin-4-yl)benzamide (CXD101), or a pharmaceutically acceptable salt thereof, separately, sequentially or simultaneously with an immune checkpoint inhibitor, or a pharmaceutically acceptable salt thereof.

In another aspect, the present invention relates to a method of potentiating the immune response to a tumour, the method comprising administering to a patient in need of such treatment a therapeutically effective amount of N-(2-aminophenyl)-4-(1-[(1,3-dimethyl-1H-pyrazol-4-yl)methyl]piperidin-4-yl)benzamide (CXD101), or a pharmaceutically acceptable salt thereof, as defined herein and an immune checkpoint inhibitor, or a pharmaceutically acceptable salt thereof, either sequentially, separately or simultaneously.

As indicated above, the immune checkpoint inhibitor may be any immune checkpoint inhibitor as defined in any of the embodiments herein.

The combination therapy may be in the form of a combined formulation of N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor, or a pharmaceutically acceptable salt thereof, for simultaneous administration or they may be administered as separate formulations. The separate formulations may be administered sequentially, separately or simultaneously.

In one embodiment the separate formulations of N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor, or a pharmaceutically acceptable salt thereof, are administered simultaneously (optionally repeatedly).

In one embodiment the separate formulations of N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor, or a pharmaceutically acceptable salt thereof, are administered sequentially (optionally repeatedly).

In one embodiment the separate formulations of N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor, or a pharmaceutically acceptable salt thereof, are administered separately (optionally repeatedly).

The skilled person will understand that where the separate formulations of N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor, or a pharmaceutically acceptable salt thereof, are administered sequentially or serially that this could be administration of N-(2-aminophenyl)-4-(1-[(1,3-dimethyl-1H-pyrazol-4-yl)methyl]piperidin-4-yl)benzamide (CXD101), or a pharmaceutically acceptable salt thereof, followed by an immune checkpoint inhibitor, or a pharmaceutically acceptable salt thereof, or an immune checkpoint inhibitor, or a pharmaceutically acceptable salt thereof, followed by N-(2-aminophenyl)-4-(1-[(1,3-dimethyl-1H-pyrazol-4-yl)methyl]piperidin-4-yl)benzamide (CXD101).

In one embodiment the separate formulations of N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor, or a pharmaceutically acceptable salt thereof, may be administered in alternative dosing patterns. Where the administration of the separate formulations of N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor, or a pharmaceutically acceptable salt thereof, is sequential or separate, the delay in administering the second formulation should not be such as to lose the beneficial effect of the combination therapy.

In another aspect, the present invention provides a method of inhibiting HDAC and immune checkpoint in vitro or in vivo, said method comprising contacting a cell with an effective amount of a combination of N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor as defined herein.

In another aspect, the present invention provides a method of inhibiting cell proliferation in vitro or in vivo, said method comprising contacting a cell with an effective amount of a combination of N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor as defined herein.

Pharmaceutical Compositions

In one aspect the present invention relates to a pharmaceutical composition comprising a combination of N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor, or a pharmaceutically acceptable salt thereof, as defined herein, and one or more pharmaceutically acceptable excipients.

The pharmaceutical compositions of the invention may be in a form suitable for oral use (for example as tablets, lozenges, hard or soft capsules, aqueous or oily suspensions, emulsions, dispersible powders or granules, syrups or elixirs), for topical use (for example as creams, ointments, gels, or aqueous or oily solutions or suspensions), for administration by inhalation (for example as a finely divided powder or a liquid aerosol), for administration by insufflation (for example as a finely divided powder) or for parenteral administration (for example as a sterile aqueous or oily solution for intravenous, subcutaneous, intramuscular, intraperitoneal or intramuscular dosing or as a suppository for rectal dosing).

The pharmaceutical compositions of the invention will typically be for parenteral administration when the inhibitors are antibodies.

The pharmaceutical compositions may be obtained by conventional procedures using conventional pharmaceutical excipients well known in the art. Thus, compositions intended for oral use may contain, for example, one or more colouring, sweetening, flavouring and/or preservative agents.

An effective amount of a combination of an N-(2-aminophenyl)-4-(1-[(1,3-dimethyl-1H-pyrazol-4-yl)methyl]piperidin-4-yl)benzamide (CXD101), or a pharmaceutically acceptable salt thereof, or immune checkpoint inhibitor for use in the combination therapy of the invention is an amount sufficient to treat or prevent a proliferative condition referred to herein, slow its progression and/or reduce the symptoms associated with the condition.

The amount of active ingredient that is combined with one or more excipients to produce a single dosage form will necessarily vary depending upon the individual treated and the particular route of administration. For example, a formulation intended for oral administration to humans will generally contain, for example, from 0.5 mg to 0.5 g of active agent (more suitably from 0.5 to 100 mg, for example from 1 to 30 mg) compounded with an appropriate and convenient amount of excipients which may vary from about 5 to about 98 percent by weight of the total composition.

The size of the dose for therapeutic or prophylactic purposes of a combination of the invention will naturally vary according to the nature and severity of the conditions, the age and sex of the animal or patient and the route of administration, according to well-known principles of medicine.

In using a combination of the invention for therapeutic or prophylactic purposes it will generally be administered with a therapeutically effective dose of the particular immune checkpoint inhibitor selected. These dosages are known in the art and will vary from one inhibitor to another. The dosage may, for example, be in the range of 0.1 mg/kg to 30 mg/kg body weight. The doing schedule will also vary from one immune checkpoint inhibitor to another. Suitable doing schedules are known in the art.

The CXD101 compound is suitably administered orally, optionally in the form of a tablet or capsule (for example, a tablet or capsule containing 10 mg of CXD101). Typically, the dosage for the CXD101 compound will be 20-40 mg per day. Suitably, the daily dose is administered in divided doses, with a twice daily dosing schedule being generally preferred. CXD101 is suitably dosed for 2 to 8 consecutive days, more suitably 3 to 7 consecutive days and most suitably for 5 consecutive days over a two or three week period. This dosing schedule can be repeated on a two or three week cycle throughout the duration of immune checkpoint inhibitor therapy.

In an embodiment, the CXD101 compound is administered at a dosage of 10-20 mg twice daily for 3 to 7 consecutive days of a two or three week cycle and the therapy is continued for the duration of the immune checkpoint inhibitor therapy.

In a particular embodiment, the CXD101 compound is administered at a dosage of 10-20 mg twice daily for 5 consecutive days of a two or three week cycle (i.e. 5 sayd of treatment followed by 9 days with no treatment in a two week cycle and 16 days without treatment in a three week cycle) and the therapy is continued for the duration of the immune checkpoint inhibitor therapy.

Routes of Administration

The combination of the invention or pharmaceutical compositions comprising said combination may be administered to a subject by any appropriate or convenient route of administration, whether systemically/peripherally or topically (i.e., at the site of desired action).

Depending on the nature of the inhibitor, routes of administration include, but are not limited to, oral (e.g., by ingestion); buccal; sublingual; transdermal (including, e.g., by a patch, plaster, etc.); transmucosal (including, e.g., by a patch, plaster, etc.); intranasal (e.g., by nasal spray); ocular (e.g., by eye drops); pulmonary (e.g., by inhalation or insufflation therapy using, e.g., via an aerosol, e.g., through the mouth or nose); rectal (e.g., by suppository or enema); vaginal (e.g., by pessary); parenteral, for example, by injection, including subcutaneous, intradermal, intramuscular, intravenous, intra-arterial, intracardiac, intrathecal, intraspinal, intracapsular, subcapsular, intraorbital, intraperitoneal, intratracheal, subcuticular, intraarticular, subarachnoid, and intrasternal; by implant of a depot or reservoir, for example, subcutaneously or intramuscularly.

CXD101 is suitably administered orally and the immune checkpoint inhibitor is suitably administered parenterally.

Additional Therapeutic Agents

The combination treatment defined herein may be applied as a sole therapy for the treatment of the specified condition or it may involve, in addition to the combination therapy of the present invention, one or more additional therapies (including treatment with another therapeutic agent, surgery or other therapeutic interventions such as radiotherapy in the oncology setting).

Typically, the other therapeutic agent used in combination with the combination therapy of the present invention will be one or more therapeutic agents used as the standard of care for the treatment of the disease or condition concerned. The other therapeutic agent may include, for example, another drug used for the treatment of the condition concerned, or an agent that modulates the biological response to the combination therapy of the invention, such as, for example, an immunomodulatory agent.

Such conjoint treatment may be achieved by way of the simultaneous, sequential or separate dosing of the individual components of the treatment. Such combination products employ the compounds of this invention within the dosage range described hereinbefore and the other pharmaceutically-active agent within its approved dosage range.

The antiproliferative combination therapy defined hereinbefore may be applied as a sole therapy or may involve, in addition to the compound of the invention, conventional surgery or radiotherapy or chemotherapy. Such chemotherapy may include one or more of the following categories of anti-tumour agents:— other antiproliferative/antineoplastic drugs and combinations thereof, as used in medical oncology, such as alkylating agents (for example cis-platin, oxaliplatin, carboplatin, cyclophosphamide, nitrogen mustard, melphalan, chlorambucil, busulphan, temozolamide and nitrosoureas); antimetabolites (for example gemcitabine and antifolates such as fluoropyrimidines like 5-fluorouracil and tegafur, raltitrexed, methotrexate, cytosine arabinoside, and hydroxyurea); antitumour antibiotics (for example anthracyclines like adriamycin, bleomycin, doxorubicin, daunomycin, epirubicin, idarubicin, mitomycin-C, dactinomycin and mithramycin); antimitotic agents (for example vinca alkaloids like vincristine, vinblastine, vindesine and vinorelbine and taxoids like taxol and taxotere and polokinase inhibitors); and topoisomerase inhibitors (for example epipodophyllotoxins like etoposide and teniposide, amsacrine, topotecan and camptothecin);

cytostatic agents such as antioestrogens (for example tamoxifen, fulvestrant, toremifene, raloxifene, droloxifene and iodoxyfene), antiandrogens (for example bicalutamide, flutamide, nilutamide and cyproterone acetate), LHRH antagonists or LHRH agonists (for example goserelin, leuprorelin and buserelin), progestogens (for example megestrol acetate), aromatase inhibitors (for example as anastrozole, letrozole, vorazole and exemestane) and inhibitors of 5α-reductase such as finasteride;

anti-invasion agents [for example c-Src kinase family inhibitors like 4-(6-chloro-2,3-methylenedioxyanilino)-7-[2-(4-methylpiperazin-1-yl)ethoxy]-5-tetrahydropyran-4-yloxyquinazoline (AZD0530; International Patent Application WO 01/94341), N-(2-chloro-6-methylphenyl)-2-{6-[4-(2-hydroxyethyl)piperazin-1-yl]-2-methylpyrimidin-4-ylamino}thiazole-5-carboxamide (dasatinib, BMS-354825; J. Med. Chem., 2004, 47, 6658-6661) and bosutinib (SKI-606), and metalloproteinase inhibitors like marimastat, inhibitors of urokinase plasminogen activator receptor function or antibodies to Heparanase]; inhibitors of growth factor function: for example such inhibitors include growth factor antibodies and growth factor receptor antibodies (for example the anti-erbB2 antibody trastuzumab [Herceptin™], the anti-EGFR antibody panitumumab, the anti-erbB1 antibody cetuximab [Erbitux, C225] and any growth factor or growth factor receptor antibodies disclosed by Stern et al. (Critical reviews in oncology/haematology, 2005, Vol. 54, pp 11-29); such inhibitors also include tyrosine kinase inhibitors, for example inhibitors of the epidermal growth factor family (for example EGFR family tyrosine kinase inhibitors such as N-(3-chloro-4-fluorophenyl)-7-methoxy-6-(3-morpholinopropoxy)quinazolin-4-amine (gefitinib, ZD1839), N-(3-ethynylphenyl)-6,7-bis(2-methoxyethoxy)quinazolin-4-amine (erlotinib, OSI-774) and 6-acrylamido-N-(3-chloro-4-fluorophenyl)-7-(3-morpholinopropoxy)-quinazolin-4-amine (CI 1033), erbB2 tyrosine kinase inhibitors such as lapatinib); inhibitors of the hepatocyte growth factor family; inhibitors of the insulin growth factor family; inhibitors of the platelet-derived growth factor family such as imatinib and/or nilotinib (AMN107); inhibitors of serine/threonine kinases (for example Ras/Raf signalling inhibitors such as farnesyl transferase inhibitors, for example sorafenib (BAY 43-9006), tipifarnib (R115777) and lonafarnib (SCH66336)), inhibitors of cell signalling through MEK and/or AKT kinases, c-kit inhibitors, abl kinase inhibitors, PI3 kinase inhibitors, Plt3 kinase inhibitors, CSF-1R kinase inhibitors, IGF receptor (insulin-like growth factor) kinase inhibitors; aurora kinase inhibitors (for example AZD1152, PH739358, VX-680, MLN8054, R763, MP235, MP529, VX-528 AND AX39459) and cyclin dependent kinase inhibitors such as CDK2 and/or CDK4 inhibitors;

antiangiogenic agents such as those which inhibit the effects of vascular endothelial growth factor, [for example the anti-vascular endothelial cell growth factor antibody bevacizumab (Avastin™) and for example, a VEGF receptor tyrosine kinase inhibitor such as vandetanib (ZD6474), vatalanib (PTK787), sunitinib (SU11248), axitinib (AG-013736), pazopanib (GW 786034) and 4-(4-fluoro-2-methylindol-5-yloxy)-6-methoxy-7-(3-pyrrolidin-1-ylpropoxy)quinazoline (AZD2171; Example 240 within WO 00/47212), compounds such as those disclosed in International Patent Applications WO97/22596, WO 97/30035, WO 97/32856 and WO 98/13354 and compounds that work by other mechanisms (for example linomide, inhibitors of integrin αvβ3 function and angiostatin)];

vascular damaging agents such as Combretastatin A4 and compounds disclosed in International Patent Applications WO 99/02166, WO 00/40529, WO 00/41669, WO 01/92224, WO 02/04434 and WO 02/08213;

an endothelin receptor antagonist, for example zibotentan (ZD4054) or atrasentan;

antisense therapies, for example those which are directed to the targets listed above, such as ISIS 2503, an anti-ras antisense;

gene therapy approaches, including for example approaches to replace aberrant genes such as aberrant p53 or aberrant BRCA1 or BRCA2, GDEPT (gene-directed enzyme pro-drug therapy) approaches such as those using cytosine deaminase, thymidine kinase or a bacterial nitroreductase enzyme and approaches to increase patient tolerance to chemotherapy or radiotherapy such as multi-drug resistance gene therapy; and immunotherapy approaches, including for example ex-vivo and in-vivo approaches to increase the immunogenicity of patient tumour cells, such as transfection with cytokines such as interleukin 2, interleukin 4 or granulocyte-macrophage colony stimulating factor, approaches to decrease T-cell anergy, approaches using transfected immune cells such as cytokine-transfected dendritic cells, approaches using cytokine-transfected tumour cell lines and approaches using anti-idiotypic antibodies.

In a particular embodiment, the antiproliferative treatment defined hereinbefore may involve, in addition to the combination therapy of the invention, conventional surgery or radiotherapy or chemotherapy.

Such conjoint treatment may be achieved by way of the simultaneous, sequential or separate dosing of the individual components of the treatment. Such combination products employ the combination therapy of this invention within the dosage range described hereinbefore and the other pharmaceutically-active agent within its approved dosage range.

According to this aspect of the invention there is provided a combination for use in the treatment of a cancer (for example a cancer involving a solid tumour) comprising a combination therapy of the invention as defined hereinbefore, and another anti-tumour agent.

According to this aspect of the invention there is provided a combination for use in the treatment of a proliferative condition, such as cancer (for example a cancer involving a solid tumour), comprising a combination therapy of the invention as defined hereinbefore, and any one of the anti-tumour agents listed herein above.

In a further aspect of the invention there is provided a combination product of the invention for use in the treatment of cancer in combination with another anti-tumour agent, optionally selected from one listed herein above.

DESCRIPTION OF DRAWINGS

Embodiments of the invention will be described, by way of example only, with reference to the accompanying drawings, in which.

ii) Quantitation of acetylation level on histone H3 upon CXD101 treatment.

iii) Western blot of histone H3 level and its acetylation upon CXD101 treatment.

B: Read assignment category of RNAseq data derived from SW620 cells.

C: Heatmap displaying differentially expressed genes between CXD101-treated and control samples of SW620 cells.

Figure 2:
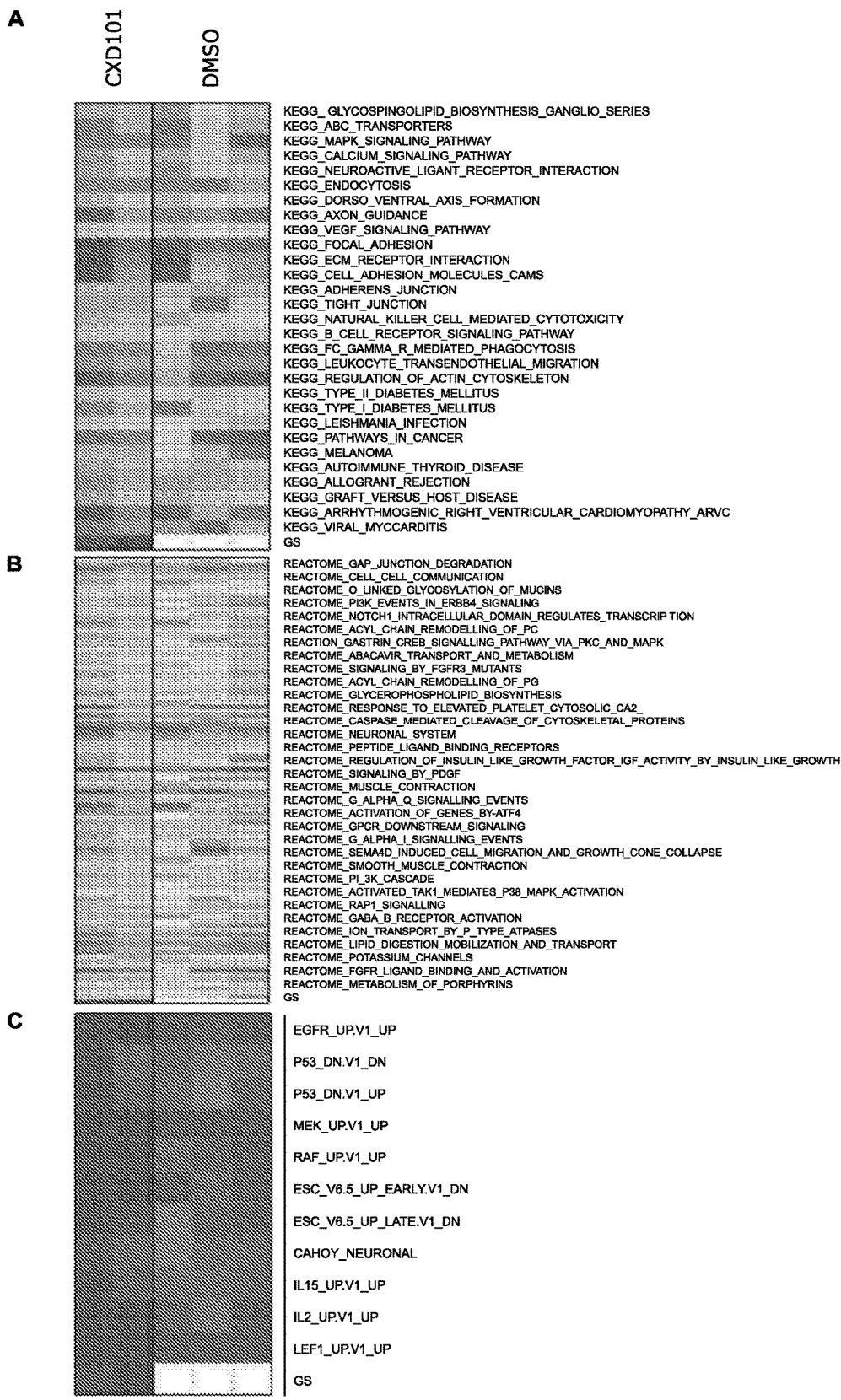
Figure 2:
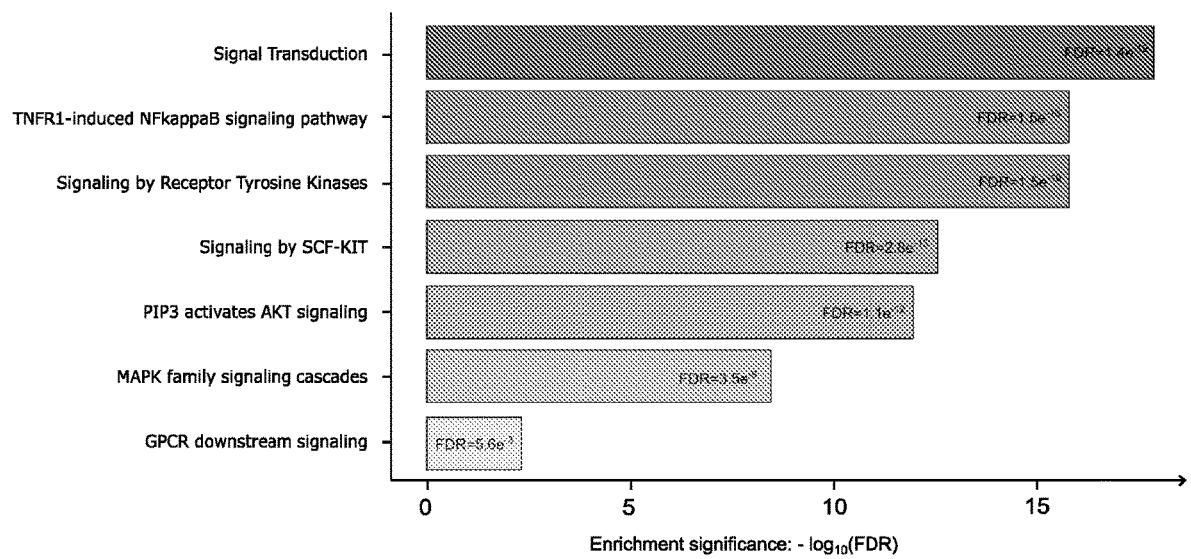
Figure 2:
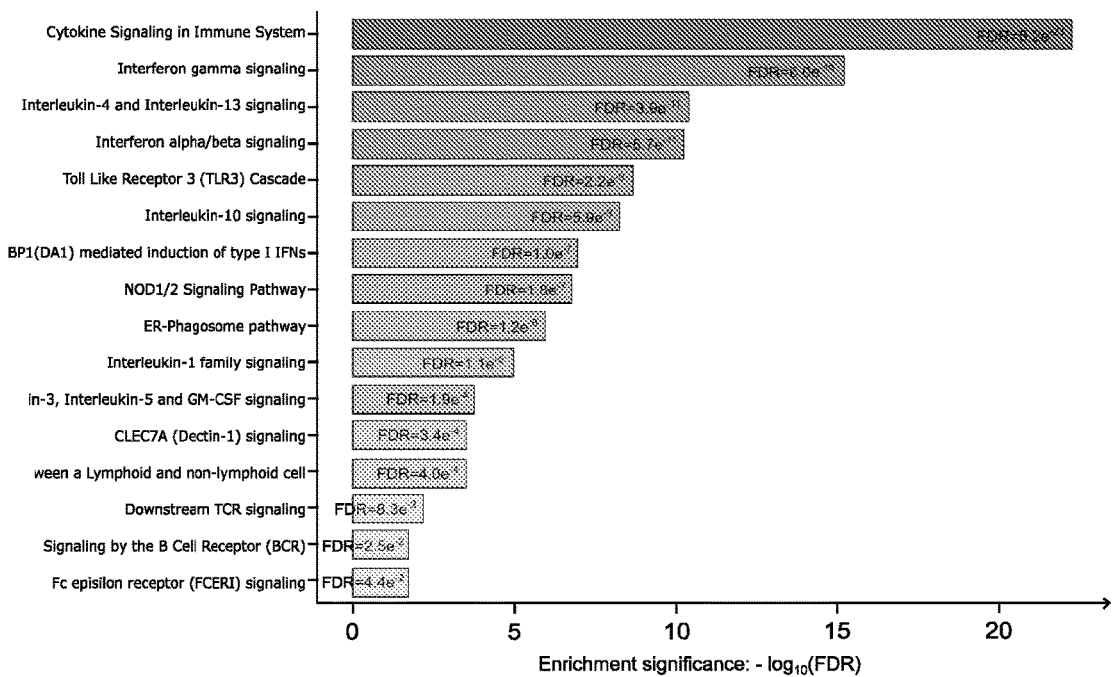

FIG. 2: Genome-wide analysis on CXD101 treated SW620 cells

Heatmaps show PGSEA statistic (Z-score) for a given gene set calculated from fold change in expression between CXD101 treatment and the control group. Blue indicates gene sets with decreased expression; while red corresponds to those with increased. GS row shows colour shades for extreme Z-score values.

a) Enriched MSigDB:C2 (v6.2) gene sets derived from KEGG pathway database.

b) Enriched MSigDB:C2 (v6.2) gene sets derived from REACTOME pathway database c) Enriched MSigDB:C6 oncogenic signatures defined from microarray gene expression data from cancer gene perturbations.

d) Significant concepts identified with enrichment analysis applied to differentially expressed genes identified in transcriptomes of SW620 cells subjected to CXD101 treatment in the REACTOME pathways (d) and REACTOME pathways signal transduction sub-ontology (e). Gene lists were ranked in accordance with their relatedness to immune function and disfunction as implemented in Pi/XGR R packages. Bars represent FDRs for every concept tested.

Figure 3:
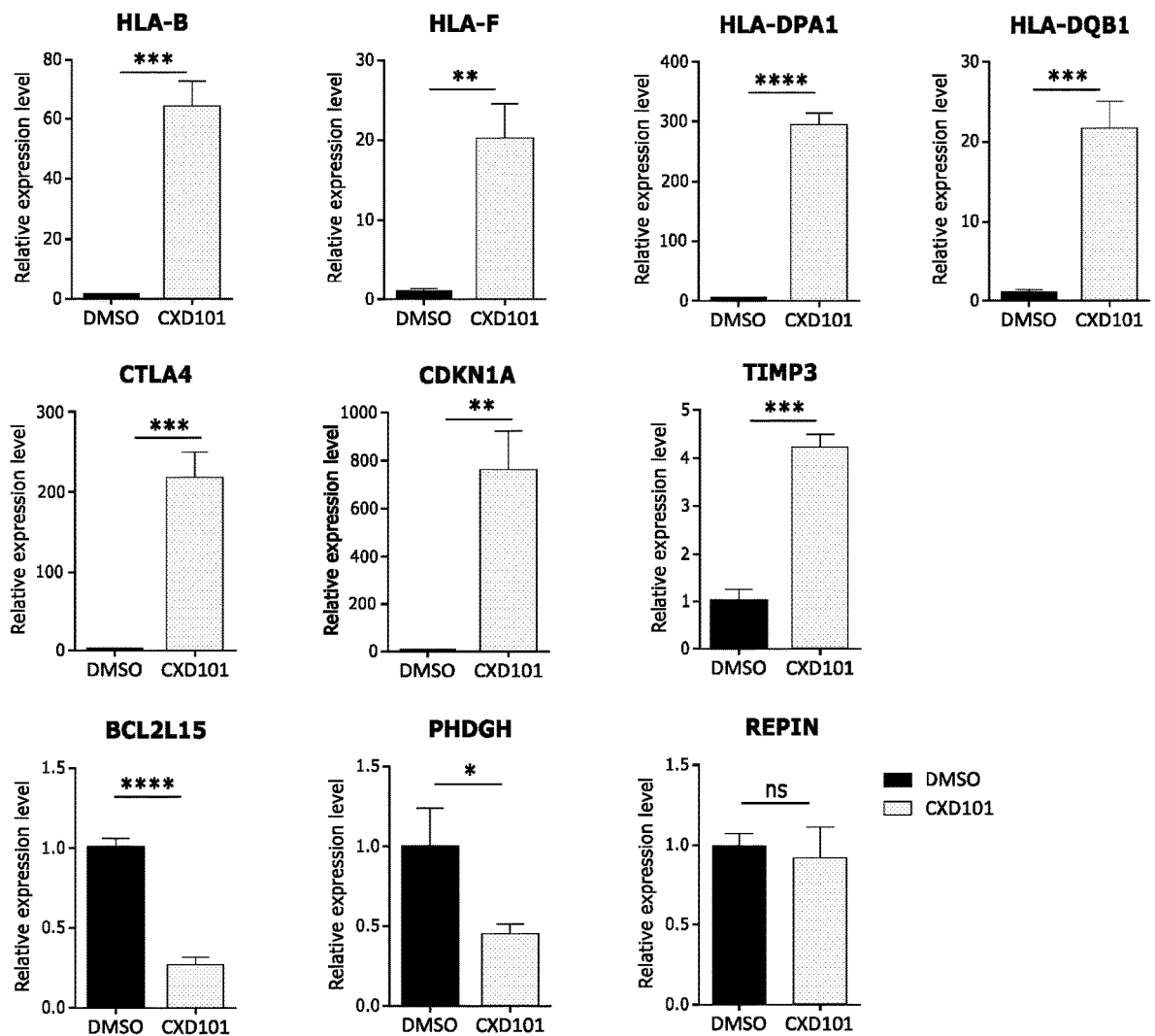

FIG. 3: CXD101 alters gene expression of immune-related targets in SW620 cells

Analysis by qPCR of genes identified in the RNAseq at the single gene level. Treatment with CXD101 increases expression of HLA-B, HLA-F, HLA-DPA1, HLA-DQB1, CTLA4, CDKN1A, TIMP3, decreases PHGDH, BCL2L15, and has no effect on REPIN1.

Figure 4:
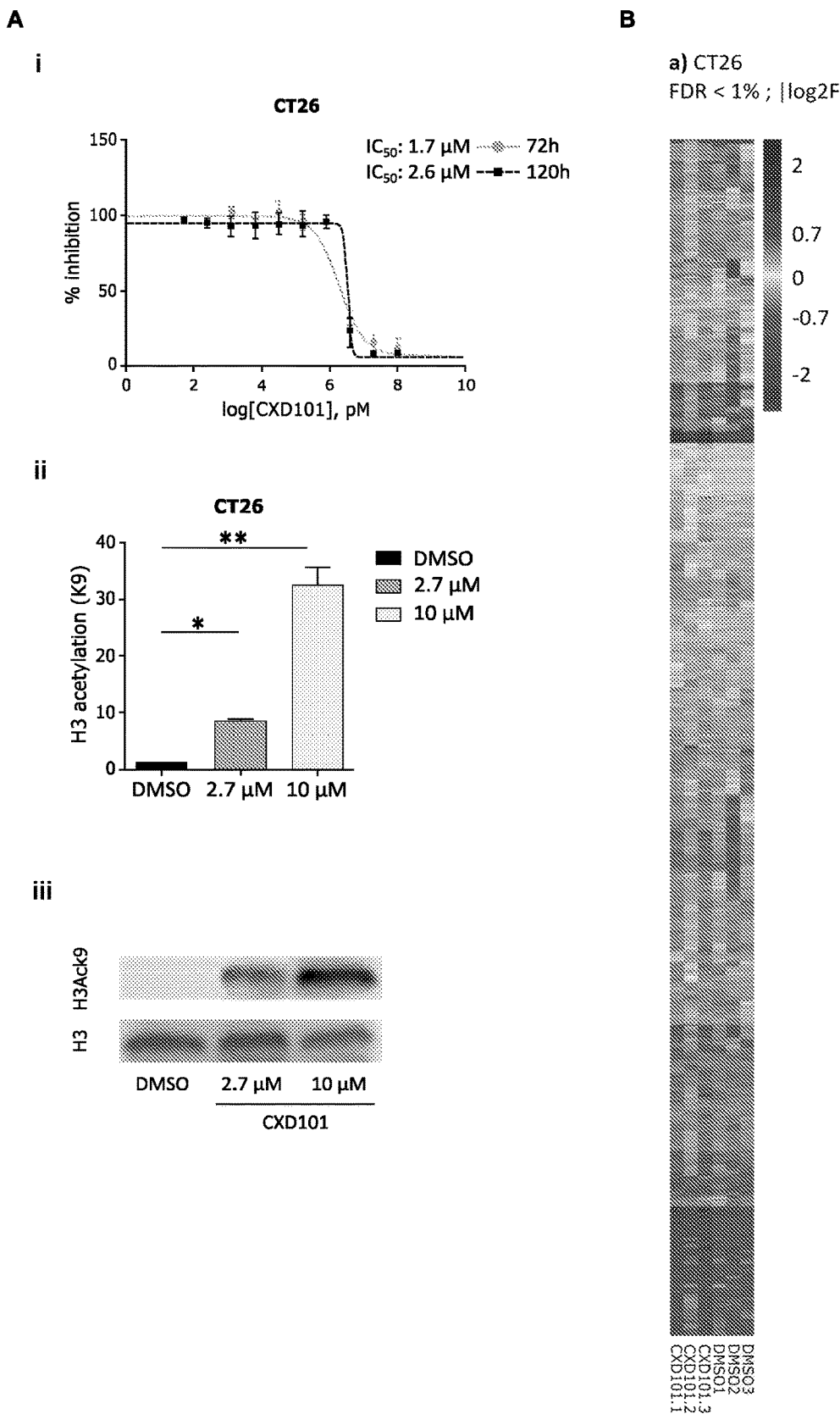

FIG. 4: CXD101 blocks proliferation of mouse colorectal colon26 cells by inhibiting HDAC activity A: CXD101 inhibits proliferation of colon26 cells in a dose- and time-dependent manner. Incubation with CXD101 increases the H3 acetylation in cells in a dose-dependent manner.

B: Read assignment category of RNAseq data derived from colon26 cells.

C: Heatmap displaying differentially expressed genes between CXD101-treated and control samples of colon26 cells.

Figure 5:
Figure 5:
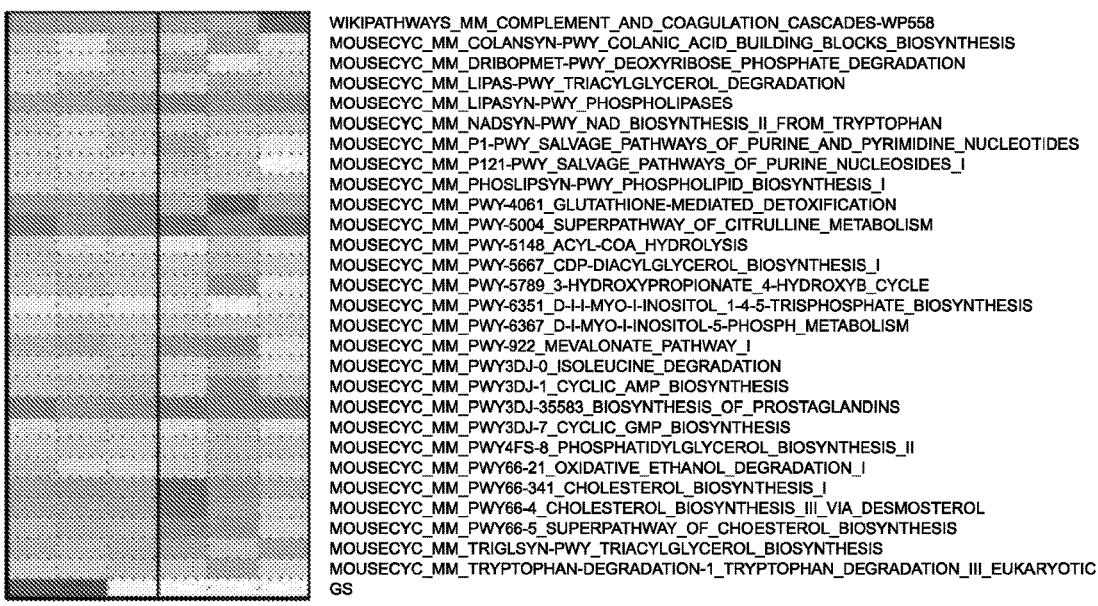
Figure 5:
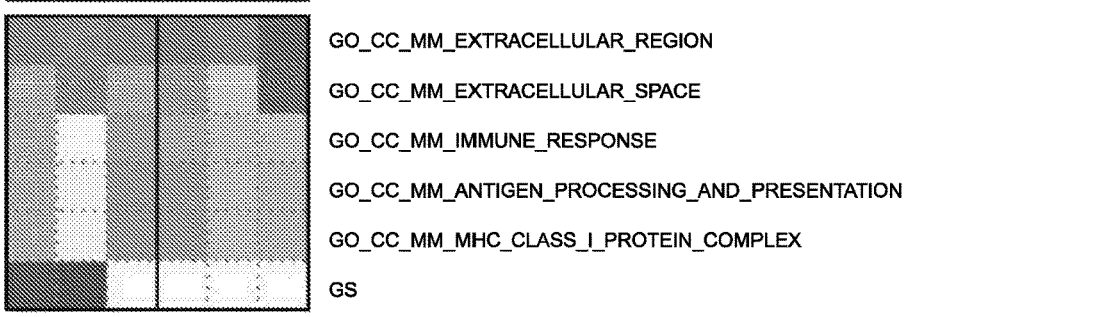
Figure 5:
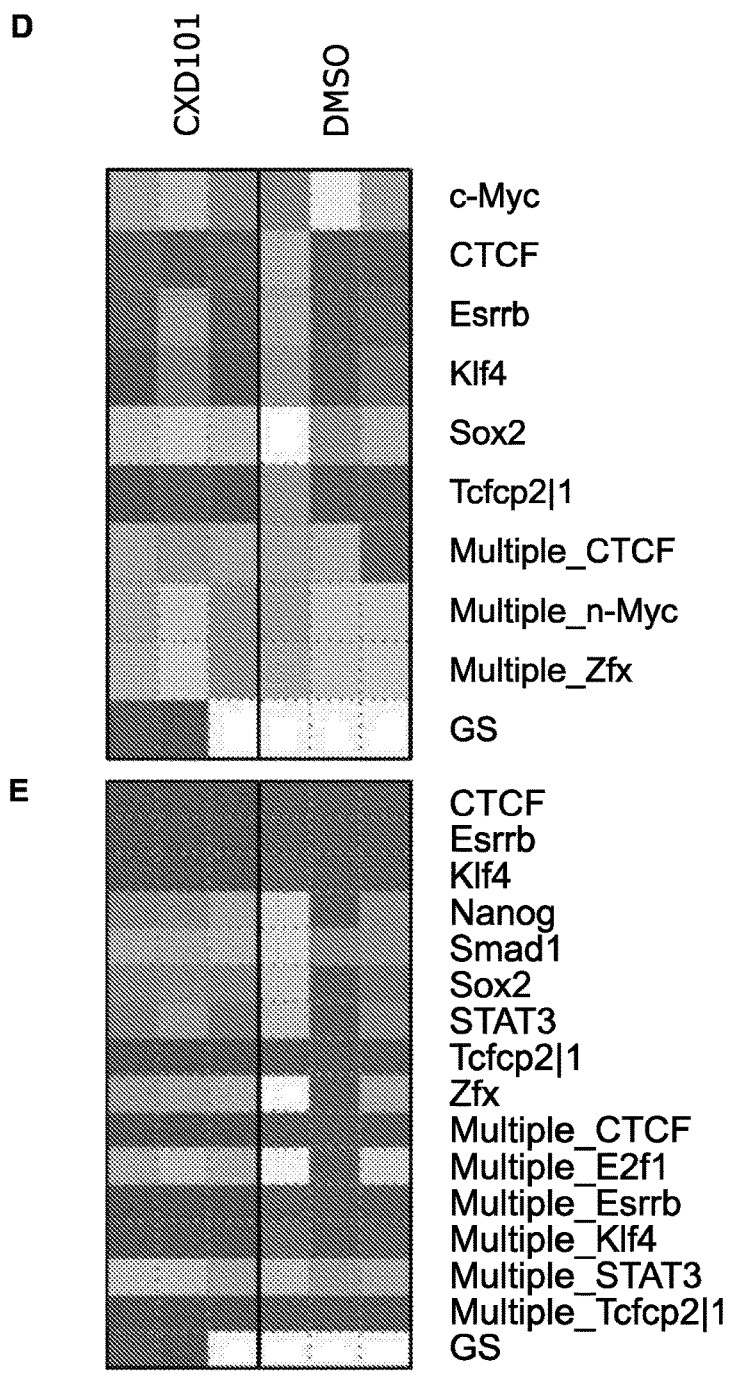

FIG. 5: Genome-wide analysis on CXD101 treated colon26 cells

Significant concepts identified with PGSEA analysis of transcriptomes of colon26 cells following CXD101 treatment. Heatmaps show PGSEA statistic (Z-score) for a given gene set calculated from fold change in expression between two experimental groups. Blue cells indicate gene sets with decreased expression; while red corresponds to those with increased. GS row shows color shades for extreme Z-score values.
  a) Enriched KEGG_mm_metabolic pathway ontology terms
  b) Enriched curated pathway ontology terms
  c) Enriched GO ontology terms,
  d) Enriched concepts corresponding to gene sets containing binding sites of a named transcription factor within 1 Kb region upstream of TSS,
  e) Enriched concepts corresponding to genesets containing binding sites of a named transcription factor within 10 Kb region upstream of TSS.

Figure 6:
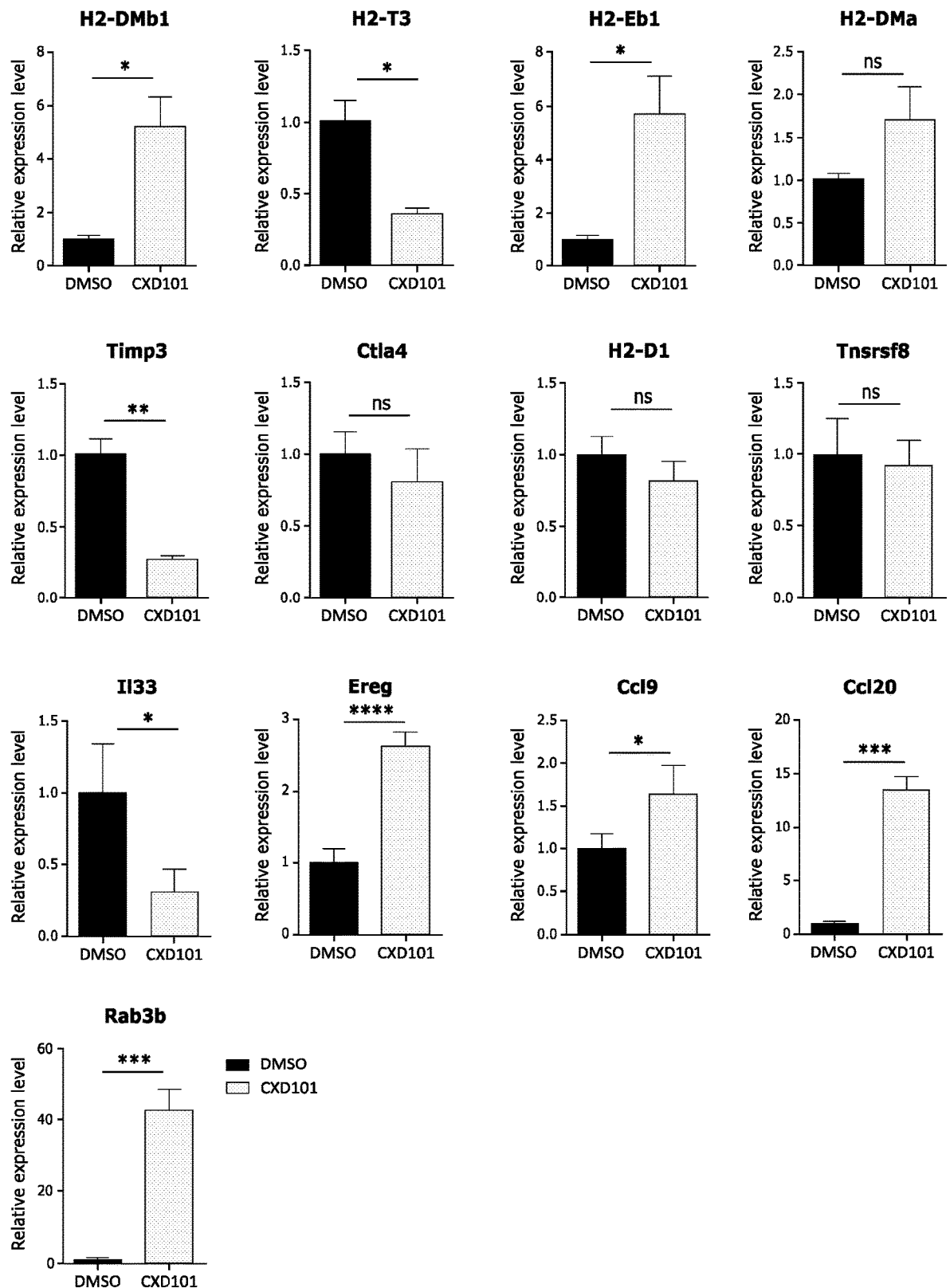

FIG. 6: CXD101 alters gene expression of immune-related targets in colon26 cells Analysis by qPCR of genes identified in the RNAseq at the single gene level in colon26 cells. Treatment with CXD101 increased expression of H2-DMb1 and H2-Eb1, H2-Dma, Ereg, Timp3, Ccl9, Cc20, Il33 and Rab3b, decreased H2-T3, and has no effects on Ctla4, H2-D1 and Tnfsrf8.

Figure 7:
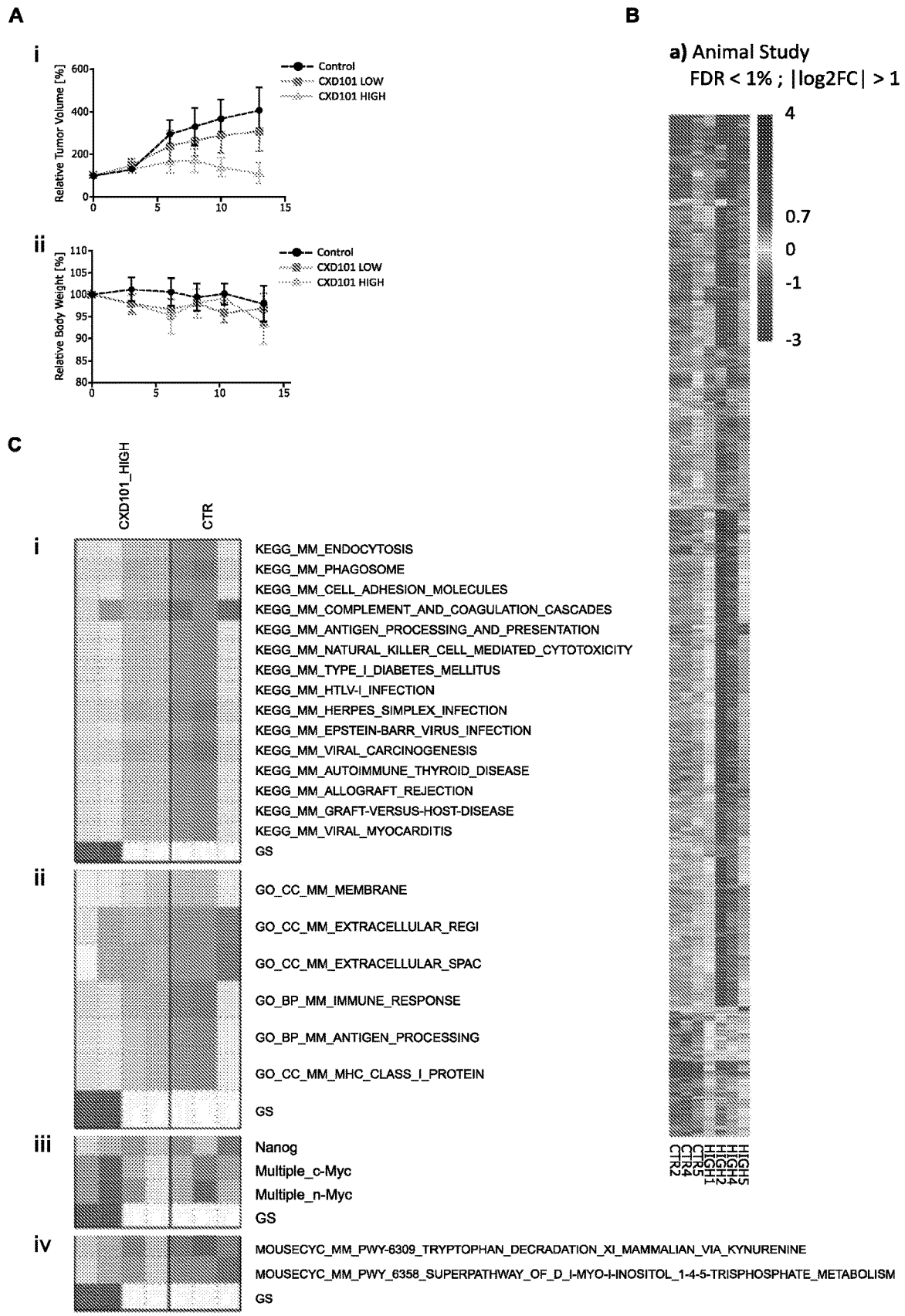

FIG. 7: CXD101 mono-therapy decreases tumour progression and has genome-wide effects.
  a) i) Impact of single CXD101 treatment on relative tumour volume (low; 15 mg/kg, high 50 mg/kg)
     ii) Impact of single CXD101 treatment on relative weight (low; 15 mg/kg, high 50 mg/kg)
  b) Heatmap displaying differentially expressed genes between CXD101-treated and control samples of colon26 tumours.
  c) Significant concepts identified with PGSEA analysis of transcriptomes of colon26 tumours following CXD101 treatment. Heatmaps show PGSEA statistic (Z-score) for a given gene set calculated from fold change in expression between two experimental groups. Blue cells indicate gene sets with decreased expression; while red corresponds to those with increased. GS row shows color shades for extreme Z-score values. KEGG (i) and GO analysis (ii, iii and iv).

Figure 8:
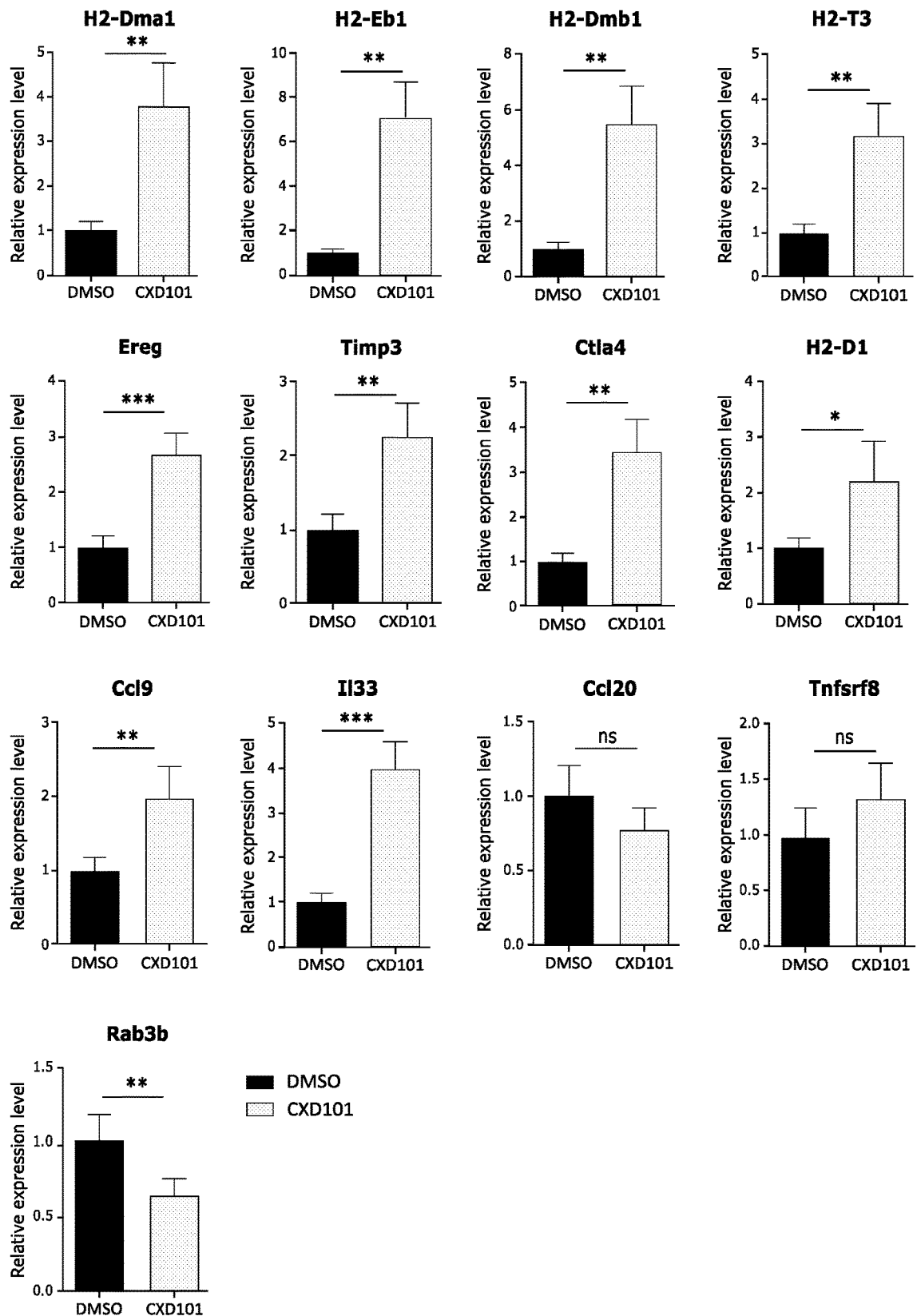

FIG. 8: Changes in gene expression induced by CXD101 treatment of colon26 tumours Analysis by qPCR of genes identified in the RNAseq at the single gene level in colon26 tumours. Treatment with CXD101 increased expression of H2-DMb1 and H2-Eb1, H2-Dmb1, H2-T3, Ereg, Timp3, Ctla4, H2-D1, Ccl9, 1133, decreased Rab3b, and had no effects on Ccl20 and Tnfsrf8.

Figure 9:
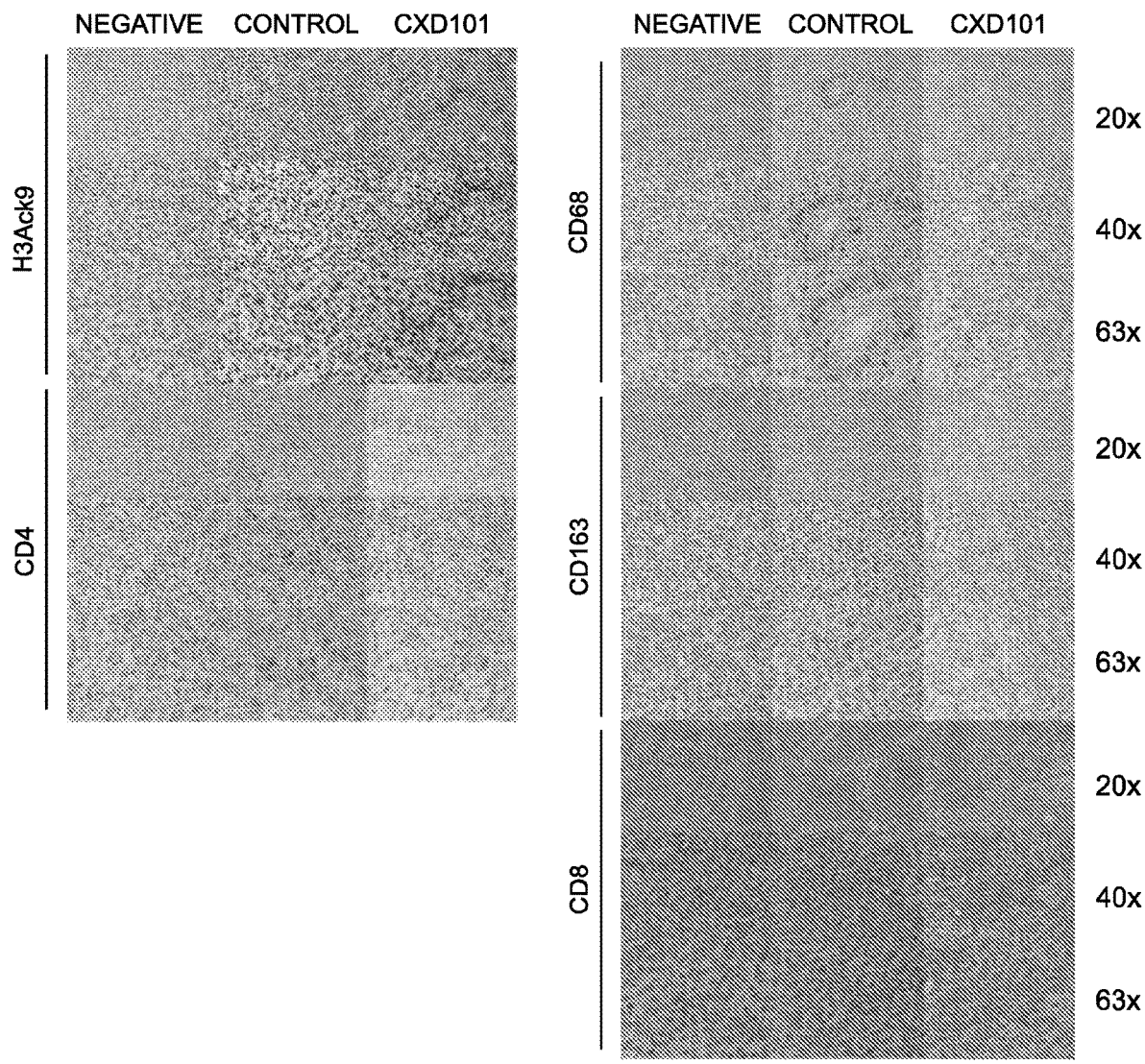

FIG. 9: CXD101 affects tumour the microenvironment of colon26 tumours Representative pictures of IHC staining of negative, control and CXD101-treated samples.

Figure 10:
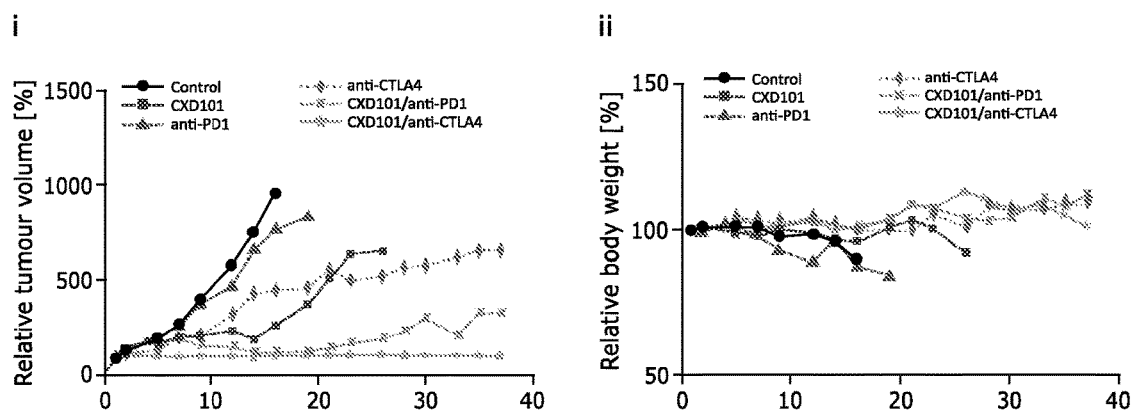
Figure 10:
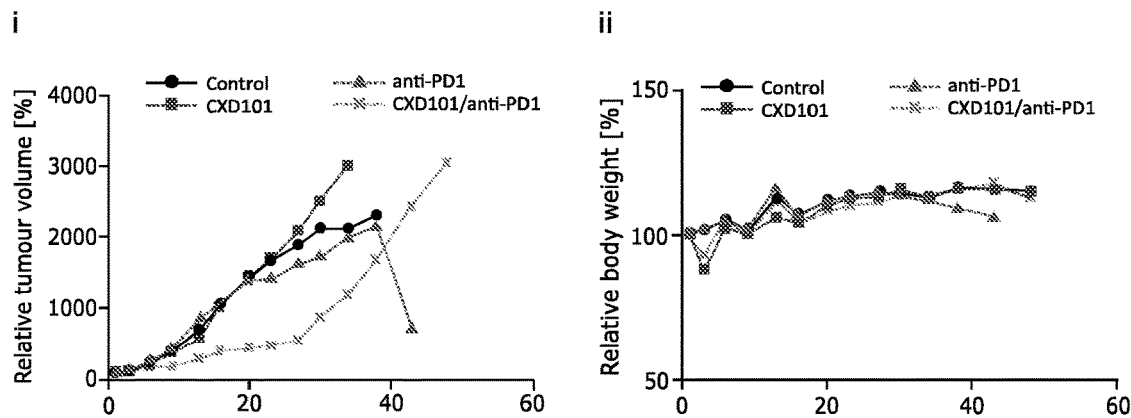
Figure 10:
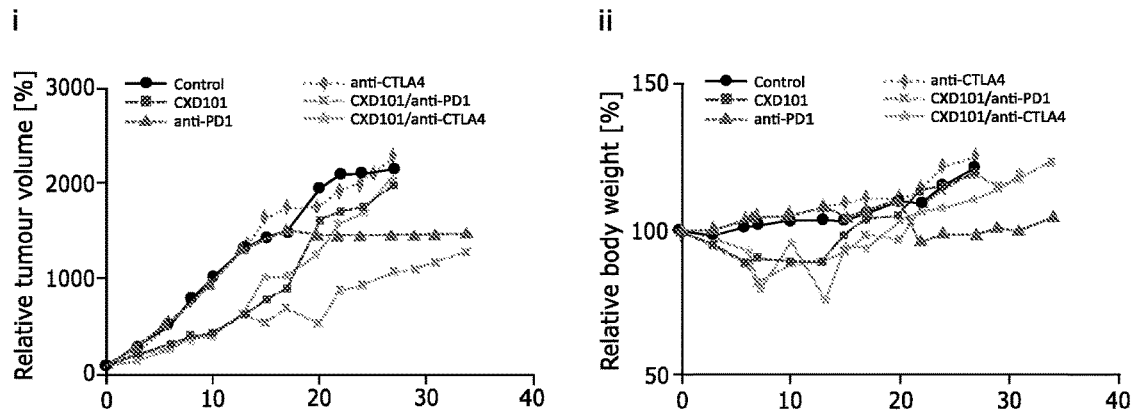

FIG. 10: Combined treatment with CXD101 and anti-PD1 or anti-CTLA4 in mouse tumour models Colon26 (ai), MC38 (bi) or A20 (ci) syngeneic mouse tumours showing the impact of mono-therapy or the combined treatment as indicated.
  ii) Impact of the indicated treatments on relative weight.

Figure 11:
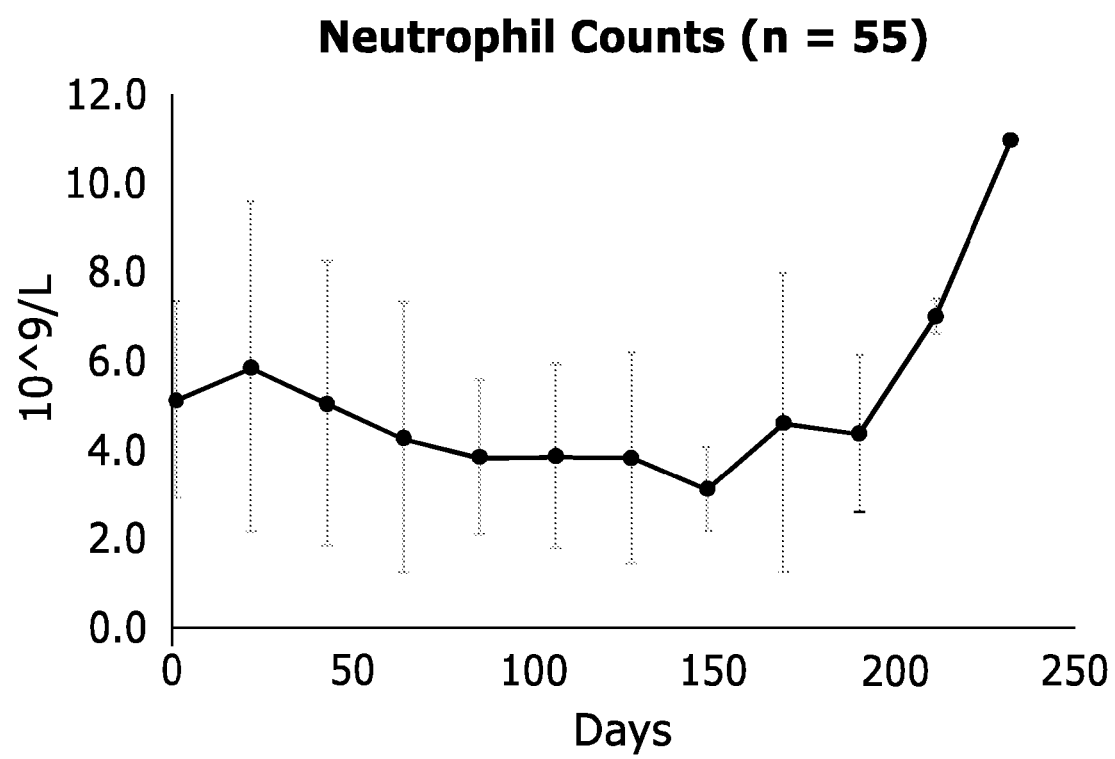

FIG. 11: Protection against immune mediated colitis by CXD101: Proposed mechanism of action Neutrophil counts in study CTL-101-023. Day 232 data point is based on one outlier subject who had high neutrophils at baseline (9.4 $10^9$/L).

EXAMPLE SECTION

Summary

Aberrant acetylation has been strongly linked to tumourigenesis, and the modulation of acetylation through targeting histone deacetylase (HDAC) with small molecule inhibitors has been the focus of many clinical trials. However, clinical success on solid cancers, like colorectal cancer (CRC), has been limited, in part because the cancer-relevant mechanisms through which HDAC inhibitors act remain largely unknown. Here, we have explored at the global systems biology level how HDAC inhibitors affect gene expression, using the novel HDAC inhibitor CXD101. In human HCT116 CRC cells a diverse set of differentially expressed genes were either up- or down-regulated. Functional profiling of the expression data highlighted immunology-related enriched gene sets involved with antigen processing, the MHC complex and natural killer cells. Similar gene sets were apparent when global gene expression was investigated in murine colon26 cells treated with CXD101, and also in syngeneic colon26 tumours growing in vivo.

The ability of CXD101 to increase immune-relevant gene expression coincided with an altered tumour micro-environment (TME), especially in the population of tumour-infiltrating lymphocytes, tumour-associated macrophages and natural killer cells. Synergistic anti-tumour activity was apparent when CXD101 was combined with immune oncology (IO) agents, like anti-PD1 and anti-CTLA4, contrasting with the negligible effect of mono-therapy anti-PD1 or anti-CTLA4. The ability to re-instate immune recognition of tumour cells with HDAC inhibitor treatment combined with the synergy between HDAC inhibitors and IO agents provides a powerful rationale for exploring the combined effect of CXD101 with IO agents in human cancers.

Lysine acetylation is regulated by two groups of enzymes, with histone acetyl-transferases (HAT) mediating the acetylation event (1), and histone deacetylases (HDAC) providing the deacetylation event (2). Lysine acetylation influences many proteins and pathways with diverse functional roles (3), and aberrant protein acetylation takes on an important role in driving the malignant phenotype (4).

Deregulation of HDAC activity occurs in many different types of cancer and HDAC as a cancer target has been validated in many pre-clinical models (5). Therapeutically however clinical success has been rather limited (6). Most clinical activity with HDAC inhibitor-based drugs has been observed in haematological malignancies (7); recent approvals include panobinostat for multiple myeloma, and chidamide for T cell lymphoma (8). However, generally speaking, other than in haematological malignancies, HDAC inhibitors have met with limited success and shown only modest clinical activity in the wide spectrum of solid cancers in which they have been tested (7). For example, in colorectal cancer negligible activity was observed with HDAC inhibitors as a mono-therapy or in combination therapies (9). It is therefore likely that the full extent of their clinical utility has yet to be realised.

CXD101 is a promising second-generation inhibitor with selective activity towards Class I HDAC subunits (10). It is a potent anti-proliferative agent in vitro with marked activity in pre-clinical tumour progression models. In clinical studies in human patients, CXD101 demonstrated a favourable safety profile; the MTD for CXD101 observed was 20 mg B.D. for 5 days in a 3-weekly cycle (10). Encouraging and durable activity was seen in patients with T-cell lymphoma, follicular lymphoma and Hodgkin lymphoma (including post-allogenic stem cell transplantation), with tumour reduction evident in 63% of patients (10). Although efficacious in haematological malignancy as monotherapies, there is a limited scientific understanding on how best to deploy HDAC inhibitors for clinical benefit in solid cancers (11). We believe that this in part reflects the limited information available on the of the significant cancer-relevant pathways upon which HDAC inhibitors act. This knowledge would allow for a more scientifically driven clinical strategy in solid cancers therapies to be evaluated.

With this question in mind, we have explored the molecular and cellular mechanisms through which HDAC inhibitors act using CXD101 as the candidate HDAC inhibitor under study. By taking a systems biology genome-wide approach on colorectal cancer cells treated with CXD101, we identified a diverse set of differentially expressed genes, which included a significant population of up- and down-regulated genes. Functional profiling of the expression data highlighted immune recognition and specifically antigen presentation as terms enriched in the data. Similar enriched terms occurred in the genomic expression profile derived murine colon26 (CT26) colorectal cancer cells both in vitro, and significantly similar effects on gene expression occurred in a syngeneic tumour in vivo treated with CXD101. The altered gene expression profile prompted us to assess the tumour micro-environment (TME) (12), where we observed a marked impact on tumour-infiltrating lymphocytes and other immune relevant cells upon treatment with CXD101. The influence on immune relevant gene expression and associated changes in the TME led us on to test the therapeutic impact of CXD101 in combination with agents that act through the immune system, like the immune oncology (IO) agents anti-PD1 and anti-CTLA4 (13). In contrast to single IO agent activity (14), synergistic anti-tumour effects were observed in the CXD101-IO combination therapy, suggesting that the immunological changes in the TME caused by CXD101 act to enhance the anti-tumour effects of IO agents, on tumours that would otherwise be poorly responsive (15). These results have important implications for the clinical application of HDAC inhibitors and provide a strong rationale for testing the combined effect of HDAC inhibitors with IO agents in human solid malignancies.

Results

CXD101 Treatment Causes Genome-Wide Effects on Gene Expression.

Figure 1:
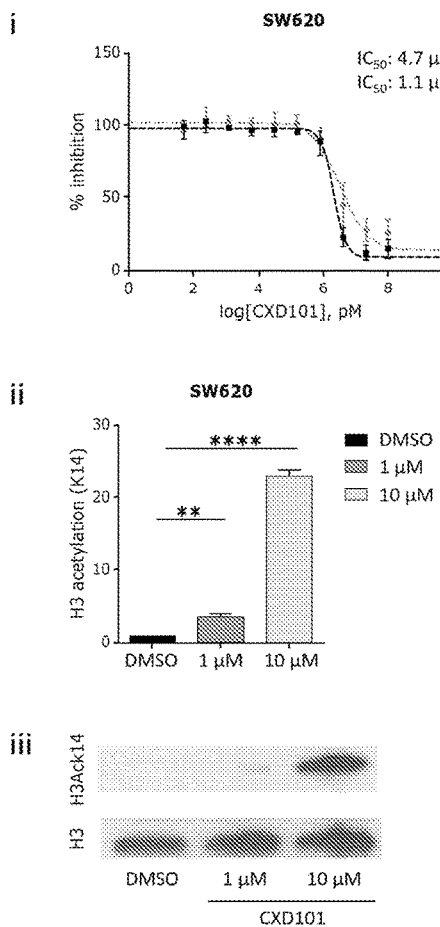
FIG. 1: CXD101 blocks proliferation of human colon cancer cells by inhibiting HDAC activity A: i) Effect of CXD101 on SW620 human colon adenocarcinoma cells measure by MTT assay.
Figure 1:
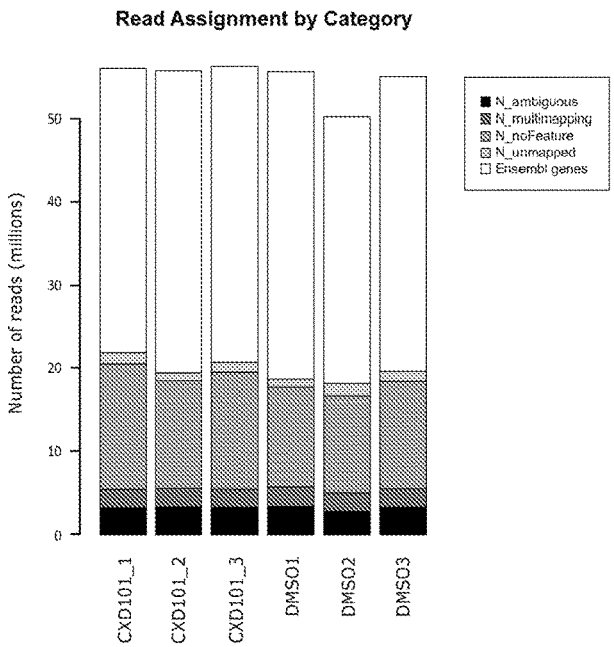
Figure 1:
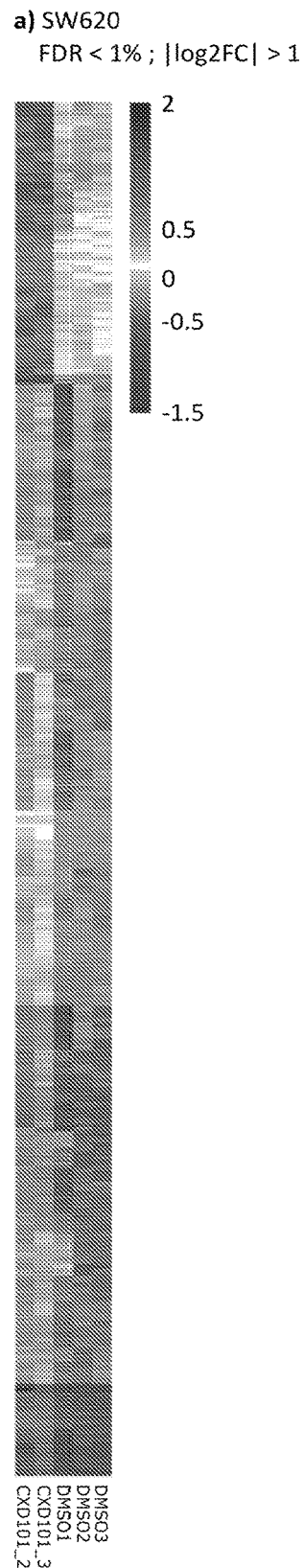

We assessed the effect of CXD101 on a variety of human CRC cell lines (16), including SW620, LoVo and HCT-15, for time and dose-dependency of treatment. We selected SW620 for further analysis, because of their typical sensitivity pattern to CXD101 at 72 hours of treatment and associated increased level of acetylation on histone H3 lysine (FIG. 1), as expected upon inhibition of HDAC activity (17). We chose treatment conditions where effects of CXD101 on cell viability were minimal, but there was an increase in the level of the acetylation mark (FIG. 1a), thus reducing any indirect effects on gene expression caused by cell mortality.

We performed RNA-seq on polyA-enriched RNA to assess the effect of CXD101 on the global transcript profile in SW620 cells compared to the vehicle-alone (DMSO) treatment (18). The FASTQ data were aligned to the reference human genome (hg19) with STAR aligner and analysed for differential expression using Bioconductor and DESeq2 R suite (19). The sequencing data were of high quality with on average 92% of the reads able to be mapped to the genome (FIG. 1b). Mining the RNA-seq data set for transcripts (with log 2 FC >1 and FDR <1%) regulated upon CXD101 treatment revealed a large number of transcripts, about 2500, that were differentially expressed genes (DEGs) under these conditions (FIG. 1c). Within the population of genes, the majority were up-regulated although a significant proportion was also down-regulated (70% compared to 30% respectively (FIG. 1c).

We assessed the Gene Ontology (GO) terms which were enriched in the RNA-seq using the topGO R algorithm and Fisher exact test to calculate the significance of the GO term (20). Enriched GO biological process terms (for DEGs with log 2 FC >1 and FDR <1%) included positive regulation and negative regulation of transcription. Significantly, there were numerous enriched terms connected with the immune system, including control of thymocyte apoptosis, T helper cell differentiation and monocyte differentiation (FIG. 2). We also performed Gene Set Enrichment Analysis (GSEA) with the piano R package (21), which highlighted enrichment in the immunological signature set of the Molecular Signatures DataBase (MSigDB) (22), where the gene sets related to T- and B-cell receptor signalling, NK cytotoxicity, cytokine signalling, cell cycle arrest, apoptosis and immune response (innate and inflammatory included), highlighting the possibility that CXD101 treatment altered immunologically-relevant gene expression.

It was important to validate the results from the RNA-seq. We therefore measured the expression of a number of DEGs identified in the RNA-seq data set where there was evidence for differential expression upon CXD101 treatment. Given the GO and GSEA analysis highlighted genes involved with the immune system, we included relevant genes in the analysis. Genes within the Major Histocompatibility Complex (MHC), encoding either Class I or Class II antigens like HLA-B and F, and HLA-DPA1 and DQB1 respectively, were significantly up-regulated DEGs (FIG. 3). Curiously, the CTLA4 gene involved with immune checkpoint control was also induced upon treating SW620 cells with CXD101 (FIG. 3); the expression of CTLA4 in SW620 cells is consistent with previous studies which noted the expression of CTLA4 in tumour cells including melanoma and CRC (23). Other genes that we tested included CDKN1A and TIMP3, where RNA levels were increased in treated cells (FIG. 3). We also validated genes where the RNA-seq indicated RNA down-regulation in treated cells, including BCL2L15 and PHDGH (FIG. 3); as expected, expression was reduced in treated cells when the individual RNAs were measured (FIG. 3). For a control gene, unaffected by treatment, we studied repin which under both conditions had a similar expression level (FIG. 3). At a general level, the analysis of RNA expression at the single gene level highlighted the ability of CXD101 to regulate immune relevant gene expression.

CXD101 Regulates Genes Involved with Immune Recognition

Given the GO and GSEA analysis highlighted terms connected with immunological recognition (FIG. 2), and genes connected with antigen presentation like MHC genes were up-regulated in CXD101 treated cells, we reasoned that CXD101 may have a wider impact than only on tumour cells and could perhaps affect immune-relevant cells in the tumour micro-environment (TME). We investigated this idea using the murine syngeneic colon cancer model colon 26 (CT26) and initially looked into the gene expression changes which occurred in colon 26 cells grown in vitro. We treated colon26 cells with CXD101 and performed RNA seq analysis on polyA-enriched mRNA under conditions where there was a CXD101-dependent increase in the acetylation of histone 3 (K9) (FIG. 4).

The RNAseq data was aligned to the reference *M. musculus* genome (mm10) with STAR aligner and analysed for differential expression. We found that 1891 genes (DEGs with log 2 FC >1 and FDR (1%) were up-regulated and 611 down-regulated (FIG. 4). Enriched GO terms using the topGO R algorithm and the same log 2 FC and FDR included antigen processing and presentation, lymphocyte chemotaxis (BP terms), MHC class II protein complex binding, TAP binding, T cell receptor binding (MF terms) and MHC class I and II (CC terms), indicating that GO terms connected with immune recognition and antigen presentation were enriched in the DEG set (FIG. 5). Out of 1142 differentially expressed genes identified following CXD101 treatment, 36% (416) were immune-related when analysed using the immunogenicity database (ref), and 34% (388) and 15% (176) when analysed with Import and Immunome databases (ref). We further evaluated transcripts identified in the colon26 RNAseq at the single gene level, focusing on murine genes which are homologues of the immune-related genes identified in human SW620 cells, which included genes in the murine MHC H2 complex. A number of H2 genes including class I and class II genes were induced including H2-D1, DMA, DMB1 and EB1 (FIG. 6). Other genes with immune-related functions, such as Ccl9, Cc120, Ereg and Rab3b, were also up-regulated (FIG. 6).

Genome-Wide Effects of CXD101 During Tumourigenesis

To assess gene expression in tumours that were growing in vivo, we evaluated the effect of CXD101 in the syngeneic colon26 colon carcinoma model in tumours grown subcutaneously in Balb/c mice, with CXD101 given orally for two 5-day consecutive periods and performed RNAseq on RNA purified from the tumours. Formalin-fixed paraffin-embedded samples were also prepared to assess by immunohistochemistry (IHC) the tumour micro-environment.

CXD101 treatment caused a significant inhibition of tumour growth (FIG. 7). The effect was dose-dependent, as more tumour-inhibition occurred with a higher dose of CXD101 (50 mg/kg compared to 15 mg/kg). There was minimal effect on body weight (FIG. 7), indicating at this gross level that CXD101 is a well-tolerated agent. We performed RNA seq on polyA-enriched RNA prepared from the tumours. In a similar way to the analysis of colon26 in vitro, the RNAseq data was aligned to the reference *M. musculus* genome (mm10) with STAR aligner and analysed for differential expression. We analysed DEGs (log 2 FC >1 and FDR <1%) that were up-regulated and down-regulated. Many genes were up-regulated and down-regulated (FIG. 7), although quantitatively a smaller DEG set was apparent in vivo compared to in vitro (1141 compared to 2502) Further, of the DEGs regulated in tumours, a high proportion reflected genes involved with immune related functions (FIG. 7). We then assessed whether the same genes identified in the in vitro treated colon26 cells were similarly regulated in vivo. When a number of candidate genes were examined by qPCR we found increased expression across a range of MHC genes, including H2-DMB1, H2-EB1, H2-T3, H2-DMA and H2-D1; other immune relevant genes exhibiting increased expression upon CXD101 treatment included CTLA4, IL33, CCL9, CCL20 (FIG. 8). Other genes like RAB3B were down-regulated upon CXD101 treatment (FIG. 8). These results indicate that CXD101 regulates immune relevant gene expression in the microenvironment of a tumours.

We reasoned that if the alterations in immune-relevant gene expression were to be biologically relevant, then we should see evidence in the colon26 tumours for immunological changes, for example, in the status of tumour-infiltrating lymphocytic populations in the TME. We evaluated this possibility by performing IHC with markers for different T lymphocyte and other relevant cell populations on tumour sections taken from colon26 tumours. To confirm that CXD101 had inhibited HDAC activity, we examined the acetylation level of H3K9 in colon26 tumour biopsies. We found increased levels of nuclear H3K9 acetylation in the CXD101 treated animals compared to the untreated animals (FIG. 9), confirming the inhibitory effect of CXD101 on HDAC under the conditions of the study. We further evaluated the level of helper CD4 T lymphocytes, and cytotoxic CD8 T lymphocytes in the tumour biopsies. Relative to the untreated control animals, there was a significant increase in the level of CD4 and in CD8 lymphocytes (FIG. 9). T suppressor lymphocytes, Tregs, were assessed by measuring the level of FoxP3, a marker for Treg lymphocytes (24). Generally, the level of Tregs was quite low and the changes observed upon CXD101 treatment were quite modest. We also studied the level of tumour-associated macrophages (TAMs) which often provide a tumour-promoting role in the TME (25). We used two markers which recognise macrophages; CD68, which is a pan-macrophage marker, and CD163 which is a marker for the M2 population of macrophages (26). Both CD68 and CD163 populations of macrophages were reduced upon CXD101 treatment compared to untreated animals (FIG. 9). These results establish that there are significant changes in the TME upon treatment with CXD101.

CXD101 and Immune Oncology Agents Synergise on Resistant Tumours

The ability of CXD101 to influence immune-relevant gene expression like MHC genes, and alter the profile of TILs and macrophage population in the TME, prompted us to examine the combined effect of CXD101 with immune oncology (10) agents, such as anti-PD1 and anti-CTLA4 (27), which act through the immune system to release the checkpoint mechanisms which prevent the T cell response (28). It is noteworthy that, in this respect, CT26 tumours growing in syngeneic mice are poorly responsive to the effect of 10 agents when administered as a single agent monotherapy (29). Previous genomic characterization of colon26 cell line showed mutation in KRAS and lack of mutations in MMR, POLD1/POLE, and BRAF genes, suggesting that colon26 a model for non-hypermutated/MSS human CRC (30). We therefore evaluated the effect of combining CXD101 with either anti-PD1 or anti-CTLA4, with the objective of assessing whether any enhanced anti-tumour effect of combining the two classes of agent was evident.

As expected, single agent mono-therapy anti-PD1 or anti-CTLA4 had little effect on the growth of colon26 tumours (FIG. 10). CXD101 caused an inhibitory effect on tumour growth, but the tumour began to progress at 16th day. However, when both agents were combined in a single treatment schedule, there was a marked inhibition of tumour growth, which was superior to the anti-tumour effect of either agent alone (FIG. 10). Significantly, the combined therapy was well-tolerated reflected in the body weight of the animals (FIG. 10). We performed a similar experiment using the murine MC38 model, which is derived from a grade-III adenocarcinoma that was chemically induced in a female C57BL/6 mouse and used since then as a transplantable mouse tumour model for hypermutated/MSI CRC (31). Unlike CT26, MC38 underwent a modest response to anti-PD1 when dosed as a monotherapy (FIG. 10). At a similar dose of CXD101, a marginal response was observed which was not as marked as in the CT 26 model (FIG. 10). When both agents were combined, an additive effect was observed but under these conditions the effect of the combined therapy was less than seen in the colon26 model (FIG. 10).

In order to rule out that the effects of the combined therapy were specific to the colon26 and MC38 colorectal cancer model, we widened the study to the syngeneic A20 B cell lymphoma model (FIG. 10). A20 tumours are reported to express high levels of PD-L1 and are responsive to immunomodulatory antibodies (32). A dose of CXD101 (50 mg/kg) had a modest effect on tumour progression. Anti-PD1 also provided an intermediate effect on tumour progression. When combined, there was a marked effect on tumour progression (FIG. 10), highlighting the additive effect of the combined therapy on tumour progression.

Discussion

Tumours escape immune recognition through a variety of mechanisms, involving both tumour cell intrinsic mechanisms and extracellular mechanisms which affect, for example, non-malignant cells. The TME contains cells of the immune system, together with other cells like fibroblasts and pericytes (33). There are many different T lymphocyte populations in the TME, among these cytotoxic CD8 positive T cells are capable of killing tumour cells (34). CD8 cells are in turn supported by CD4 (helper) T cells (35). High numbers of CD8 and CD4 cells in the TME correlate with good prognosis (36). T cell immunity requires recognition of antigens in the context of major histocompatibility complex (MHC) class I and class II proteins by CD8+ and CD4+ T cells, respectively. The CD4 cells most often described as tumour promoting are the immune-suppressive T regulatory cells (Tregs) in part mediated through cell contact through CTLA4 (cytotoxic T lymphocyte antigen 4) (37). In vitro and preclinical models show that CTLA-4, expressed by T cells, binds members of the B7 family expressed by antigen-presenting cells (APCs) to inhibit T cell costimulation during the priming and effector phases of T cell activation (38). PD-1, expressed by activated T cells, binds the PD-1 ligands expressed by tumours and APCs to inhibit T cell effector function, a reversible phenotype termed "exhaustion" (39). PD-1 is a member of the extended CD28/CTLA4 family of T cell regulators. Several lines of evidence suggest that PD-1 and its ligands negatively regulate immune responses (40). PD-L1, the ligand for PD1, is highly expressed in several cancers and the role of PD1 in cancer immune evasion is well established (41). Many tumour cells express PD-L1 where it takes on an immune-suppressive role, and inhibition of the interaction between PD-1 and PD-L1 can enhance T-cell responses in vitro and mediate anti-tumor activity (42). This is known as immune checkpoint blockade (43). Expression of PD-L1 on tumour cells inhibits anti-tumour activity through engagement of PD-1 on effector T cells. The expression of PD-L1 on tumours is correlated with reduced survival in esophageal, pancreatic and other types of cancers, highlighting this pathway as a target for immunotherapy (44). Combination therapy using both anti-PD1 along with anti-CTLA4 therapeutics have emerged as important tumour treatments within the field of checkpoint inhibition by producing an immune-suppressive tumour micro-environment (TME).

Anti-PD-1 and CTLA4 based drugs have been shown to be helpful in treating several types of cancer, including melanoma of the skin, non-small cell lung cancer, kidney cancer, bladder cancer, head and neck cancers, and Hodgkin lymphoma (45). In other cancers, like CRC, the clinical activity is dictated by the micro-satellite status of the tumour; generally micro-satellite instable (MSI) is responsive to checkpoint inhibition (ORR of 25%) in contrast to MSS (micro-satellite stable) which is unresponsive (46). There is a pressing need to develop clinical strategies which can turn MSS into responsive disease.

Our results show at the systems biology level that CXD101, an HDAC inhibitor in clinical trials, has widespread effects on gene expression. Most significantly, the expression of genes involved in immune recognition were specifically increased in colorectal cancer cells treated with CXD101; both MHC class 1 and class 2 were increased. This reflected coincident changes in the population of immune-response relevant cells in the TME, with CD8 T lymphocytes showing a marked increase. Most significantly, in the colon26 syngeneic tumour model, which is an MSS subtype, synergistic anti-tumour effects were evident upon combining CXD101 with either anti-PD1 or anti-CTLA4. This contrasts with the effect of either as a monotherapy, where the response of colon26 tumours was minimal.

At a mechanistic level, we suggest that the ability of CXD101 to induce expression of MHC genes and thereby increase antigen presentation enables improved T cell engagement and tumour cell killing to occur. Hypothetically, breaking the PD1-PDL1 checkpoint using anti-PD1 will release T cells which can then subsequently engage with the increased level of MHC antigen on the tumour cell via the T cell receptor, leading to increased levels of tumour cell killing. This model provides a rational explanation for the synergy observed between CXD101 and checkpoint inhibitors.

Materials and Methods

Compounds

CXD101 was synthesised by AstraZeneca and stored at 4° C. Working solutions were dissolved in sterile DMSO (VWR International, USA) and stored in −20° C. for future experiments.

Cell Culture

Three human colorectal adenocarcinoma cell lines: SW620 (ATCC® CCL-227™), HCT-15 (ATCC® CCL-225™), LoVo (ATCC® CCL-229™), and one mouse colon carcinoma cell line: CT26 (ATCC® CRL-2638™) were obtained from ATCC. Human cell lines were cultured in DMEM (Lonza Group, Switzerland), while CT26 in RPMI (Biowest, France). The media were supplemented with 10% FBS and 1% penicillin-streptomycin (Lonza Group, Switzerland). Cells were cultured under standard conditions.

MTT Assay

In order to assess the cytotoxicity of CXD101, cells were seeded onto 96-well plates overnight and the next day were dosed with CXD101 and incubated for 72 h or 120 h. Next, 100 µl of Thiazolyl Blue Tetrazolium Bromide (MTT, Sigma-Aldrich, USA) was added into a well (final concentration 5 µM) and incubated for 2 h at 37° C. After that medium was discarded and formazan crystals were dissolved in 100 µl DMSO (VWR International, USA) by shaking for 15 minutes. Absorbance was read by Omega FLUOstar plate reader (BMG Labtech Ltd, Germany) at the 584 nm wavelength. Data were analysed and $IC_{50}$ doses calculated in GraphPad Prism (GraphPad Software, USA).

RNA Extraction Library Preparation and RNA-Seq Analysis

SW620 cells were seeded into 6-well plates and left to adhere overnight. Cells were treated with 1 µM, 10 µM of CXD101 for 48 h. CT26 cells were seeded onto 100 mm plates and treated with 2.7 µM and 10 µM CXD101 for 72 h. After treatment cells were harvested and total RNA extracted by means of Promega ReliaPrep™ RNA Cell Miniprep System (Promega, USA). RNA was dissolved in RNAse free water and stored in −80° C. for future analysis. RNA concentration was measured by NanoDrop 2000 (Thermo Fisher Scientific, USA). Samples were qualified for library preparation if RIN<9. Library preparation with poly (A) enrichment was performed by BGI.

RT-qPCR

Total RNA purified from DMSO- or CXD101 treated cells was transcribed into cDNA according to the manufacturer's instructions (iScript cDNA Synthesis Kit, Bio-Rad, USA). qPCR was conducted according to the manufacturer's protocol (SsoAdvanced Universal SYBR Green Supermix, Bio-Rad Laboratories, USA) on CFX Connect Real-Time System thermocycler (Bio-Rad Laboratories, USA). The sequence of the primers is presented in the table.

Bioinformatics

FASTQ files for CXD101 and DMSO treated samples in three biological replicates were trimmed to remove adapters and low-quality bases with TrimGalore v.0.4.3 (http://www.bioinformatics.babraham.ac.uk/projects/trim_galore/). The trimmed reads were aligned to the human reference genome (build hg19) with STAR aligner v.2.7 with two mismatches allowed. Differential gene expression analysis was done with the Bioconductor framework (v.3.8) and DESeq2 R package v.1.22, using read count data provided by the aligner. Genes were considered differentially expressed if the adjusted P, calculated using the Benjamini-Hochberg method in order to minimise the false discovery rate, was less than 0.01 (1%) and the change in expression level was greater than ~2-fold as compared to DMSO control (e.g. |log_2(expression fold change)|>1).

The GO enrichment analysis was done with the topGO R package (v.2.34) using the weight01 algorithm and Fisher exact test to reveal biological processes over-represented in differentially expressed gene sets. P values for GO enrichment analysis were calculated using the formula for hypergeometric distribution, reflecting the probability for a GO term to arise by chance. Statistically enriched terms were identified using a threshold FDR of 0.5%. GSEA was performed using the GSEA software (ref) and Molecular Signatures Database (v7 MSig DB).

Western Blotting

Cell pellets were lysed in TNN buffer, for 30 minutes on ice and centrifuged for another 30 minutes at maximum speed at 4° C. Protein concentration was assessed by Bradford assay (Quick Start™ Bradford 1× Dye Reagent, Bio-Rad Laboratories, USA). After gel electrophoresis, proteins were transferred onto the PVDF membrane by means of Trans-Blot® Turbo™ Transfer System (Bio-Rad Laboratories, USA) and blocked by 1 h incubation in 5% skim milk (Merck Group, Germany) in PBST at RT. To confirm acetylation induced by CXD101, membranes were incubated with anti-H3 (ab1791, abcam) antibody, anti-H3Ack9 (ab10812, abcam) in case of CT26 cells, and for SW620 with H3Ack14 antibody (#7627, Cell Signaling) overnight, at 4° C. Next, membranes were washed and treated with secondary antibody for 1 h at RT. Chemiluminescent signals were detected by LICOR C-Digit (LI-COR Biosciences, USA), and the data quantified using ImageJ software (National Institutes of Health, USA).

Immunohistochemistry

Tumours were harvested, embedded in paraffin blocks and cut into 5 µm sections. Antigen retrieval was achieved by incubating in sodium citrate. Sections were incubated with primary antibodies: anti-H3Ack9 (ab10812, abcam), anti-CD8 (ab203035, abcam), anti-CD4 (ab183685, abcam), anti-CD68 (GR300628, abcam), anti-CD163 (GR3232711, abcam and, anti-FoxP3 (14208S, New England Biolabs) and further stained with anti-rabbit secondary antibody (VECTASTAIN Elite ABC HRP Kit, Vector Laboratories Inc, USA) according to the manufacturer protocol. Signal was detected by DAB (3, 3-diaminobenzidine, Vector Laboratories Inc, USA) and sections were counterstained with haematoxylin (Hematoxylin solution Mayer's; pH 2.4, Merck Group, Germany). Pictures were taken using Leica DM2500 optical microscope (Leica Microsystems, Germany) and the signal was semi-quantified by means of ImageJ Fiji software (National Institutes of Health, USA, doi:10.1038/nmeth.2019).

Animal Models

Syngeneic colorectal tumour xenograft Colon 26 model was induced in female BALB/c mice and MC38 model in C57BL/6 mice by subcutaneous injection of cell suspension into the flank following the anaesthetization by inhalation of isoflurane. Upon solid tumour formation Colon 26 animals were divided into six experimental groups treated respectively with: vehicle control (control), CXD101, anti-PD-1 mAb (BioXCell, USA), anti-CTLA4 mAb (BioXCell, USA), combination of CXD101 with anti-PD-1 antibody and combination of CXD101 with anti-CTLA4 antibody. MC38 animals were divided into four groups, without CTLA-4-based treatment. Dosing schedule, daily dose and route of administration are presented in Table x. During the course of experiment animals were monitored twice daily and weighed three times a week. Mice in bad overall condition and/or tumour volume exceeding 1000 mm3 were euthanized. Tumour volume was calculated by two-dimensional measurement according to the formula:

$$\text{Tumour volume} = (a \times b^2) \times 0.5$$

in which a—represents the largest and, b—the perpendicular tumour diameter. The study was terminated on $36^{th}$ day (Colon 26) or $48^{th}$ day (MC38). All Colon 26 animal handling has been executed by Charles River Laboratories (Germany) personnel with compliance to all local and international laws and regulations. Experiments involving MC38 tumour model have been executed by Crown Bioscience San Diego (USA).

CXD101 Clinical Trial in Combination with Nivolumab (CTL-101-023)

A clinical trial was conducted involving 55 subjects. The clinical trial protocol is summarized below:

Protocol Number: CTL-101-023

Investigational Product: CXD101 and nivolumab

Active Ingredient(s)/INN:
 CXD101 or N-(2-aminophenyl)-4-(1-[(1,3-dimethyl-1H-pyrazol-4yl) methyl]piperidin-4-yl)benzamide is a Class I-selective histone deacetylase (HDAC) inhibitor.
 Nivolumab is a programmed death receptor-1 (PD-1)-blocking antibody.

Study Title:
 A Phase Ib Trial to Assess the Safety and Efficacy of CXD101 in Combination with the PD-1 Inhibitor Nivolumab in Patients with, Metastatic, Previously-Treated, Microsatellite-Stable Colorectal Carcinoma Study Phase: Phase Ib/II Indication Under Investigation:
  Third-line therapy for previously-treated advanced or metastatic colorectal carcinoma shown to be microsatellite-stable (MSS)

Study Objectives:
  The objective of the Phase Ib element of this study was to define a tolerable combination dose schedule of CXD101 and nivolumab
  The primary objective of the Phase II element of this study was to estimate the efficacy of CXD101 in combination with nivolumab by measuring:
    Immune Disease Control Rate (iDCR) (ie, complete response [iCR], partial response [iPR] rate, and stable disease [SD]) after Seymour et al, 2017 (iRECIST: Guidelines for Response Criteria for Use in Trials Testing; Lancet, 2017 Mar. 2. Oncol 18 (3), 143-152)

Secondary Objectives were to Determine:
  Overall survival
  Objective Response Rate (iCR+iPR)
  20-week immune-related progression-free survival
  Safety Study Design:
  Phase Ib trial: A single-arm dose escalation trial to determine the safety, tolerability and dose limiting toxicities (DLT) and therefore the maximum tolerated dose (MTD) of repeat doses of nivolumab combined with CXD101. The incidence and severity of adverse events (evaluated according to CTCAE version 4.03), vital signs, ECG parameters, biochemistry, haematology and urinalysis will be recorded to determine tolerability.
  Dose escalation was conducted as follows:

Dose Level 1
  Nivolumab 240 mg iv q 2 weekly; with CXD101 30 mg (20 mg mane, 10 mg nocte) po for 5 days q 3 weekly (n=3-6) with both drugs commencing on the same day in cycle 1.
  The first subject was observed for three weeks from first dose before the second subject commenced treatment. The third, and subsequent subjects commenced treatment after the previous subject has commenced treatment, and been observed for a period of one week without untoward effects. If one subject suffered a DLT at Dose Level 1, then up to a further 3 subjects were enrolled at this dose. If 1 or more additional subject suffered a DLT at Dose Level 1, then that dose level was considered to be above the MTD. If this is the case, further subjects (n=6) were entered at a reduced Dose Level Minus 1, (ie nivolumab 240 mg iv q 2 weekly; with CXD101 20 mg po (10 mg bid) for 5 days q 3 weekly). If however there was no DLT in the first 3 subjects; or ≤1 DLT in the first 6 subjects at Dose Level 1, escalation proceeded to Dose Level 2.

Dose Level 2
  Nivolumab 240 mg iv q 2 weekly; with CXD101 40 mg (20 mg bid) po for 5 days q 3 weekly (n=6) with both drugs commencing on the same day in cycle 1.
  The first subject was observed for three weeks from first dose before the second subject commenced treatment. The third, and subsequent subjects commenced treatment after the previous subject had commenced treatment, and been observed for a period of one week without untoward effects. If 2 or more additional subjects suffered a DLT at Dose Level 2, then this was considered to have exceeded the MTD, and Dose Level 1 will be considered the MTD. If this is the case, further subjects (n=3) were entered at the previous dose level.

DLTs were defined by the following:
  Any drug-related non-haematological ≥grade 3 toxicity excluding:
    grade 3 fatigue
    grade 3 gamma GT rise
    grade 3 nausea, vomiting if adequately treated
    grade ≥3 endocrinopathies which are adequately controlled with physiologic dose hormone replacement,
    grade ≥3 amylase abnormalities that are not associated with clinical symptoms.
    electrolyte abnormalities that can be corrected and are not felt to be a cause for clinical safety concern.
  Drug-related grade 4 neutropenia for ≥7 day or ≥grade 3 febrile neutropenia
  Grade 4 thrombocytopenia or grade 3 thrombocytopenia with associated bleeding.
  ≥Grade 2 drug related uveitis or eye pain or blurred vision that does not respond to topical therapy; renal, hepatic or neurological toxicity
  Drug related death 9 subjects were enrolled.

Phase II trial: Following completion of the Phase Ib study, a Phase II CXD101/nivolumab combination dose was conducted. A further 46 subjects were treated at the selected Phase II CXD101/nivolumab combination dose. Subjects may continue to receive CXD101/nivolumab until complete response, disease progression, unacceptable toxicity, withdrawal of consent, or other medical problems supervene.

Efficacy will be measured using Immune Response Evaluation Criteria in Solid Tumours (iRECIST) Imaging studies, typically CT scan of chest, abdomen & pelvis, supplemented by MRI of liver when required, will be performed at Baseline and after every 6 weeks, with objective confirmation of response 6 weeks (+/−1 week) after observation.

Safety parameters will be assessed as in the Phase I study. In addition there will be a series of translational analyses including correlation of tumour biomarker expression with response.

Study Sites and Location:
  This was a multi-centre study to be conducted in the UK.

Subject Eligibility Criteria:
Inclusion
  Written informed consent
  Biopsy-confirmed MSS, Mismatch Repair proficient (MMR-P) CRC. It is acceptable for this test to be performed on the archived primary colorectal cancer tissue and repeat biopsy for MSS testing is not required unless assay not yet performed and insufficient material available
  Previous first and second line treatment/adjuvant therapy, including use of oxaliplatin and irinotecan unless documented intolerance of these
  Measurable disease: longest diameter≥10 mm (short axis 15 mm for nodal lesions)
  Age >18 years
  Eastern Cooperative Oncology Group (ECOG) performance status 0, 1 or 2
  Predicted life expectancy >3 months
  Adequate organ and bone marrow function: Hb>10.0 g/dL (may be transfused to this level), neutrophils>1.5× $10^9$/L and platelets>100×$10^9$/L
  Female patients with reproductive potential must have a negative urine and serum pregnancy test prior to starting treatment. Both women of reproductive potential and men must agree to use a medically acceptable method of contraception throughout the treatment period and for 5 months after discontinuation of treatment (i.e., combined oestrogen and progestogen ovulation inhibition; progestogen-only ovulation inhibition; intrauterine device; intrauterine hormone-releasing system; bilateral tubal occlusion; or vasectomised partner). Oral contraception and parenteral hormonal contraceptives (patches, injectables and implants) that may be affected by enzyme-inducing drugs should only be used in combination with a barrier method. All males with partners of childbearing potential or whose partners are pregnant must use barrier contraception for the duration of dosing and for 5 months post-dosing.

Exclusion
  Pregnant or breast feeding
  Pre-existing auto-immune conditions
  Medical conditions requiring systemic immunosuppression
  Previous treatment with an HDAC inhibitor or PD1/PDL1 inhibitor
  Other chemotherapy, radiotherapy, or investigational therapy within 4 weeks prior to the Screening/Baseline Assessment
  Unresolved clinically significant toxicity from a previous treatment
  History of recent active chronic inflammatory bowel disease and/or bowel obstruction
  Renal function: Serum creatinine ≥1.5×ULN, or creatinine clearance <60 mL/min (Cockcroft-Gault formula)
  Liver function: AST ≥3.0; OR total bilirubin ≥1.5×ULN. For subjects with involvement of metastatic liver disease: AST ≥5.0×ULN; OR total bilirubin ≥3.0×ULN
  Clinically significant myocardial infarction, severe/unstable angina pectoris, congestive heart failure NYHA Class III or IV, or pulmonary disease within 6 months
  Symptomatic brain metastasis, uncontrolled seizure disorder, spinal cord compression, or carcinomatous meningitis
  Clinically significant active infection requiring antibiotic or antiretroviral therapy
  History of malignancy other than MSS CRC, unless there is the expectation that the malignancy has been cured, and tumour specific treatment for the malignancy has not been administered within the previous 5 years
  History of pneumonitis, immune hepatitis or myocarditis, or current uncontrolled thyroid disease
  Current positive serology for Hepatitis B or C virus
  History of any allergy to excipients of the Investigational Medicinal Products (sodium citrate dihydrate, sodium chloride, mannitol, pentetic acid, Polysorbate 80, sodium hydroxide, hydrochloric acid, hydroxypropyl methylcellulose)
  Receipt of any live vaccine 30 days or fewer prior to administration of first dose IMP
  Inability to comply with the study protocol Dosage Form and Route of Administration:
  CXD101 was presented as 10 mg HPMC capsules and taken orally for 5 consecutive days repeated every three weeks on an outpatient basis.
  Nivolumab was presented as a 10 mg/mL solution in a single-dose vial, administered as iv infusion over 60 mins, repeated every two weeks.
  CXD101 in combination with nivolumab was administered in the Phase II component of the trial at doses determined in the Phase Ib component.

Results

A total of 55 subjects were treated with CXD101 in combination with nivolumab. The selected study population were patients with advanced or metastatic MSS CRC, previously treated with at least two lines of therapy; and ECOG PS 0, 1, or 2.

The design began with a Phase Ib variable dose safety run-in (n=9). No dose-limiting toxicities were observed, and CXD101 20 mg bid q 3 wks in combination with nivolumab 240 mg q 2 wks was selected as the Phase II treatment. A further 46 subjects were then treated. The primary objective of the Phase II element was to assess immune Disease Control Rate, as determined by iRECIST CT scan tumour measurements. Secondary objectives were to determine 20-week immune-related progression-free survival; overall survival; immune Objective Response Rate, and safety.

The most frequent observed Adverse Events in CTL-101-023 were fatigue, nausea, and cytopenias. All AEs were manageable. There were no deaths or discontinuations from the study because of adverse drug reactions.

Treatment-related adverse events in CTL-101-023 patients are summarised below:

Number of CTL-101-023 patients who experienced treatment related adverse events (AEs) and serious adverse events (SAEs) (Most severe grades in ≥5% of n=55 patients)

| Adverse event | All Grades | % | G1-2 | % | G3-4 | % | SAEs |
|---|---|---|---|---|---|---|---|
| Haematology | | | | | | | |
| Anaemia | 16 | 29 | 13 | 24 | 3 | 5 | 1 |
| Neutropenia | 14 | 25 | 5 | 9 | 9 | 16 | 2 |
| Thrombocytopenia | 10 | 18 | 9 | 16 | 1 | 2 | 0 |
| Gastrointestinal | | | | | | | |
| Nausea | 25 | 45 | 24 | 43 | 1 | 2 | 2 |
| Decreased Appetite | 16 | 29 | 16 | 29 | 0 | 0 | 1 |
| Vomiting | 11 | 20 | 11 | 20 | 0 | 0 | 0 |
| Diarrhoea | 9 | 16 | 8 | 14 | 1 | 2 | 1 |
| Abdominal Pain | 6 | 11 | 6 | 11 | 0 | 0 | 0 |
| Dyspepsia | 4 | 7 | 4 | 7 | 0 | 0 | 0 |
| Constipation | 3 | 5 | 3 | 5 | 0 | 0 | 0 |
| Dry Mouth | 3 | 5 | 3 | 5 | 0 | 0 | 0 |
| Metabolic | | | | | | | |
| Hyperamylasemia | 5 | 9 | 2 | 4 | 3 | 5 | 0 |
| ALT Increased | 3 | 5 | 3 | 5 | 0 | 0 | 0 |
| AST Increased | 3 | 5 | 2 | 4 | 1 | 2 | 0 |
| Infection | | | | | | | |
| Oral Candidiasis | 4 | 7 | 4 | 7 | 0 | 0 | 0 |
| LRTI | 3 | 5 | 3 | 5 | 0 | 0 | 1 |
| Dermal/Epidermal | | | | | | | |
| Pruritis | 8 | 15 | 8 | 15 | 0 | 0 | 0 |
| Rash | 5 | 9 | 5 | 9 | 0 | 0 | 0 |
| Dry Skin | 3 | 5 | 3 | 5 | 0 | 0 | 0 |
| General/Constitutional | | | | | | | |
| Fatigue/Lethargy | 43 | 78 | 40 | 73 | 3 | 5 | 0 |
| Headache/Migraine | 6 | 11 | 6 | 11 | 0 | 0 | 1 |
| Dyspnoea | 6 | 11 | 6 | 11 | 0 | 0 | 0 |
| Chills | 3 | 5 | 3 | 5 | 0 | 0 | 0 |

CXD101 as an Anti-Inflammatory Agent

It is notable from the CTL101-023 safety data presented above (n=55) is that there are no reports of colitis; which would be expected based on a prevalence rate of 13% based on nivolumab clinical trial experience (CHECKMATE studies).

It is proposed that the improved safety profile seen in study CTL-101-023 is the product of an anti inflammatory action on behalf of the HDACi CXD101, providing colon mural protection vs the immune activity of nivolumab.

The incidence of immune-mediated colitis (IMC) ranges from 1%-25% depending on the agents used, and although endoscopically and histologically there is a significant overlap between IMC and inflammatory bowel disease, more neutrophilic inflammation without chronic inflammation is usually present in IMC. It has been observed in study CTL-101-023 that none of the patients treated with the combination of CXD101 with nivolumab suffered IMC. It was noted that CXD101 induced varying degrees of neutropenia due to myelosuppression, reducing the number of tissue associated neutrophils available to drive the inflammation underpinning IMC (FIG. 11). This evidence suggests a unique dual mechanism of action for CXD101 in suppressing IMC, namely, a direct anti-inflammatory effect mediated by inhibition of the NFKB pathway and indirectly by reduction in the number of neutrophils available to inflict colonic damage.

REFERENCES FOR EXAMPLE SECTION

1. Roth S Y, Denu J M, Allis C D. Histone Acetyltransferases. Annu Rev Biochem. 2001; 70(1):81-120.
2. Seto E, Yoshida M. Erasers of histone acetylation: the histone deacetylase enzymes. Cold Spring Harb Perspect Biol. 2014 Apr. 1; 6(4):a018713.
3. Marmorstein R, Zhou M-M. Writers and Readers of Histone Acetylation: Structure, Mechanism, and Inhibition. Cold Spring Harb Perspect Biol. 2014 Jul. 1; 6(7): a018762.
4. Gil J, Ramirez-Torres A, Encarnación-Guevara S. Lysine acetylation and cancer: A proteomics perspective. J Proteomics. 2017 06; 150:297-309.
5. De Souza C, Chatterji B P. HDAC Inhibitors as Novel Anti-Cancer Therapeutics. Recent Patents Anticancer Drug Discov. 2015; 10(2):145-62.
6. Eckschlager T, Plch J, Stiborova M, Hrabeta J. Histone Deacetylase Inhibitors as Anticancer Drugs. Int J Mol Sci. 2017 Jul. 1; 18(7).
7. Chun P. Histone deacetylase inhibitors in hematological malignancies and solid tumors. Arch Pharm Res. 2015 June; 38(6):933-49.
8. Chan T S, Tse E, Kwong Y-L. Chidamide in the treatment of peripheral T-cell lymphoma. OncoTargets Ther. 2017; 10:347-52.
9. Azad N S, E I-Khoueiry A, Yin J, Oberg A L, Flynn P, Adkins D, et al. Combination epigenetic therapy in metastatic colorectal cancer (mCRC) with subcutaneous 5-azacitidine and entinostat: a phase 2 consortium/stand up 2 cancer study. Oncotarget. 2017 May 23; 8(21): 35326-38.
10. Eyre T A, Collins G P, Gupta A, Coupe N, Sheikh S, Whittaker J, et al. A phase 1 study to assess the safety, tolerability, and pharmacokinetics of CXD101 in patients with advanced cancer. Cancer. 2019 Jan. 1; 125(1):99-108.
11. Qiu T, Zhou L, Zhu W, Wang T, Wang J, Shu Y, et al. Effects of treatment with histone deacetylase inhibitors in solid tumors: a review based on 30 clinical trials. Future Oncol Lond Engl. 2013 February; 9(2):255-69.
12. Liu S, Kong P, Wang X, Yang L, Jiang C, He W, et al. Tumor microenvironment classification based on T-cell infiltration and PD-L1 in patients with mismatch repair-proficient and -deficient colorectal cancer. Oncol Lett. 2019 February; 17(2):2335-43.
13. Katoh M. Combination immuno-oncology therapy with immune checkpoint blockers targeting PD-L1, PD-1 or CTLA4 and epigenetic drugs targeting MYC and immune evasion for precision medicine. J Thorac Dis. 2018 March; 10(3):1294-9.
14. Le D T, Uram J N, Wang H, Bartlett B R, Kemberling H, Eyring A D, et al. PD-1 Blockade in Tumors with Mismatch-Repair Deficiency. N Engl J Med. 2015 Jun. 25; 372(26):2509-20.
15. Wirta E, Seppsla T, Friman M, Vayrynen J, Ahtiainen M, Kautiainen H, et al. Immunoscore in mismatch repair-proficient and -deficient colon cancer. J Pathol Clin Res. 2017 Jul. 19; 3(3):203-13.
16. Trainer D L, Kline T, McCabe F L, Faucette L F, Feild J, Chaikin M, et al. Biological characterization and oncogene expression in human colorectal carcinoma cell lines. Int J Cancer. 1988 Feb. 15; 41(2):287-96.
17. Huang P-H, Chen C-H, Chou C-C, Sargeant A M, Kulp S K, Teng C-M, et al. Histone Deacetylase Inhibitors Stimulate Histone H3 Lysine 4 Methylation in Part Via Transcriptional Repression of Histone H3 Lysine 4 Demethylases. Mol Pharmacol. 2011 January; 79(1):197-206.
18. Kukurba K R, Montgomery S B. RNA Sequencing and Analysis. Cold Spring Harb Protoc. 2015 Apr. 13; 2015 (11):951-69.
19. Love M, Anders S, Huber W. DESeq2: Differential gene expression analysis based on the negative binomial distribution [Internet]. Bioconductor version: Release (3.9); 2019 [cited 2019 Sep. 26]. Available from: https://bioconductor.org/packages/DESeq2/
20. Thomas P D. The Gene Ontology and the Meaning of Biological Function. Methods Mol Biol Clifton NJ 2017; 1446:15-24.
21. Powers R K, Goodspeed A, Pielke-Lombardo H, Tan A-C, Costello J C. GSEA-InContext: identifying novel and common patterns in expression experiments. Bioinforma Oxf Engl. 2018 01; 34(13):i555-64.
22. Liberzon A, Subramanian A, Pinchback R, Thorvaldsdóttir H, Tamayo P, Mesirov J P. Molecular signatures database (MSigDB) 3.0. Bioinforma Oxf Engl. 2011 Jun. 15; 27(12):1739-40.
23. Seidel J A, Otsuka A, Kabashima K. Anti-PD-1 and Anti-CTLA-4 Therapies in Cancer: Mechanisms of Action, Efficacy, and Limitations. Front Oncol [Internet]. 2018 Mar. 28 [cited 2019 Sep. 26]; 8. Available from: https://www.ncbi.nlm.nih.gov/pmc/articles/PMC5883082/
24. Sayed D, E I-Badawy O H B, Eldin E N, Bakry R, Badary M S, Abd-Alrahman M E, et al. Is Foxp3 a good marker for regulatory T cells? Egypt J Immunol. 2014; 21(2):1-8.
25. Yahaya M A F, Lila M A M, Ismail S, Zainol M, Afizan N A R N M. Tumour-Associated Macrophages (TAMs) in Colon Cancer and How to Reeducate Them. J Immunol Res [Internet]. 2019 Feb. 25 [cited 2019 Sep. 26]; 2019. Available from: https://www.ncbi.nlm.nih.gov/pmc/articles/PMC6410439/
26. Bertani F R, Mozetic P, Fioramonti M, Iuliani M, Ribelli G, Pantano F, et al. Classification of M1/M2-polarized human macrophages by label-free hyperspectral reflectance confocal microscopy and multivariate analysis. Sci Rep. 2017 Aug. 21; 7(1):1-9.
27. Li Z, Song W, Rubinstein M, Liu D. Recent updates in cancer immunotherapy: a comprehensive review and perspective of the 2018 China Cancer Immunotherapy Workshop in Beijing. J Hematol Oncol J Hematol Oncol [Internet]. 2018 Dec. 21 [cited 2019 Sep. 26]; 11. Available from: https://www.ncbi.nlm.nih.gov/pmc/articles/PMC6303854/
28. Haanen J B A G, Robert C. Immune Checkpoint Inhibitors. Prog Tumor Res. 2015; 42:55-66.
29. Wilkinson R W, Leishman A J. Further Advances in Cancer Immunotherapy: Going Beyond Checkpoint Blockade. Front Immunol [Internet]. 2018 Jun. 1 [cited 2019 Sep. 25]; 9. Available from: https://www.ncbi.nlm.nih.gov/pmc/articles/PMC5992967/
30. Castle J C, Loewer M, Boegel S, de Graaf J, Bender C, Tadmor A D, et al. Immunomic, genomic and transcriptomic characterization of CT26 colorectal carcinoma. BMC Genomics [Internet]. 2014 Mar. 13 [cited 2019 Sep. 25]; 15(1). Available from: https://www.ncbi.nlm.nih.gov/pmc/articles/PMC4007559/
31. Tong Y, Yang W, Koeffler H P. Mouse models of colorectal cancer. Chin J Cancer. 2011 July; 30(7):450-62.
32. Tang F, Zheng P. Tumor cells versus host immune cells: whose PD-L1 contributes to PD-1/PD-L1 blockade mediated cancer immunotherapy? Cell Biosci [Internet]. 2018 May 2 [cited 2019 Sep. 25]; 8. Available from: https://www.ncbi.nlm.nih.gov/pmc/articles/PMC5930423/
33. Garza Trevino E N, Gonzelez P D, Valencia Salgado C I, Martinez Garza A. Effects of pericytes and colon cancer stem cells in the tumor microenvironment. Cancer Cell Int. 2019 Jul. 1; 19(1):173.
34. Martinez-Lostao L, Anel A, Pardo J. How Do Cytotoxic Lymphocytes Kill Cancer Cells? Clin Cancer Res Off J Am Assoc Cancer Res. 2015 Nov. 15; 21(22):5047-56.
35. Luckheeram R V, Zhou R, Verma A D, Xia B. CD4+ T Cells: Differentiation and Functions. Clin Dev Immunol [Internet]. 2012 [cited 2019 Sep. 26]; 2012. Available from: https://www.ncbi.nlm.nih.gov/pmc/articles/PMC3312336/
36. Matsumoto H, Thike A A, Li H, Yeong J, Koo S-L, Dent R A, et al. Increased CD4 and CD8-positive T cell infiltrate signifies good prognosis in a subset of triple-negative breast cancer. Breast Cancer Res Treat. 2016 April; 156(2):237-47.
37. Walker L S K. Treg and CTLA-4: Two intertwining pathways to immune tolerance. J Autoimmun. 2013 September; 45(100):49-57.
38. Gaudino S J, Kumar P. Cross-Talk Between Antigen Presenting Cells and T Cells Impacts Intestinal Homeostasis, Bacterial Infections, and Tumorigenesis. Front Immunol [Internet]. 2019 Mar. 6 [cited 2019 Sep. 26]; 10. Available from: https://www.ncbi.nlm.nih.gov/pmc/articles/PMC6414782/
39. Wherry E J. T cell exhaustion. Nat Immunol. 2011 June; 12(6):492-9.
40. Dong Y, Sun Q, Zhang X. PD-1 and its ligands are important immune checkpoints in cancer. Oncotarget. 2016 Dec. 10; 8(2):2171-86.
41. Vinay D S, Ryan E P, Pawelec G, Talib W H, Stagg J, Elkord E, et al. Immune evasion in cancer: Mechanistic basis and therapeutic strategies. Semin Cancer Biol. 2015 Dec. 1; 35:S185-98.
42. Wei J, Luo C, Wang Y, Guo Y, Dai H, Tong C, et al. PD-1 silencing impairs the anti-tumor function of chimeric antigen receptor modified T cells by inhibiting proliferation activity. J Immunother Cancer. 2019 Aug. 7; 7(1):209.
43. Wieder T, Eigentler T, Brenner E, Röcken M. Immune checkpoint blockade therapy. J Allergy Clin Immunol. 2018; 142(5):1403-14.
44. Alsaab H O, Sau S, Alzhrani R, Tatiparti K, Bhise K, Kashaw S K, et al. PD-1 and PD-L1 Checkpoint Signaling Inhibition for Cancer Immunotherapy: Mechanism, Combinations, and Clinical Outcome. Front Pharmacol [Internet]. 2017 Aug. 23 [cited 2019 Sep. 26]; 8. Available from: https://www.ncbi.nlm.nih.gov/pmc/articles/PMC5572324/
45. Ward F J, Dahal L N, Abu-Eid R. On the Road to Immunotherapy-Prospects for Treating Head and Neck Cancers With Checkpoint Inhibitor Antibodies. Front Immunol [Internet]. 2018 Sep. 24 [cited 2019 Sep. 26]; 9. Available from: https://www.ncbi.nlm.nih.gov/pmc/articles/PMC6165864/
46. Oliveira A F, Bretes L, Furtado I. Review of PD-1/PD-L1 Inhibitors in Metastatic dMMR/MSI-H Colorectal Cancer. Front Oncol. 2019; 9:396.

All references, including publications, patent applications, and patents, cited herein are hereby incorporated by reference in their entirety and to the same extent as if each reference were individually and specifically indicated to be incorporated by reference and were set forth in its entirety herein (to the maximum extent permitted by law).

All headings and sub-headings are used herein for convenience only and should not be construed as limiting the invention in any way.

The use of any and all examples, or exemplary language (e.g., "such as") provided herein, is intended merely to better illuminate the invention and does not pose a limitation on the scope of the invention unless otherwise paragraphed. No language in the specification should be construed as indicating any non-paragraphed element as essential to the practice of the invention.

The citation and incorporation of patent documents herein is done for convenience only and does not reflect any view of the validity, patentability, and/or enforceability of such patent documents.

This invention includes all modifications and equivalents of the subject matter recited in the paragraphs appended hereto as permitted by applicable law.

The invention claimed is:

1. A method of treating immune checkpoint inhibitor-induced colitis, the method comprising administering a therapeutically effective amount of N-(2-aminophenyl)-4-(1-[(1,3-dimethyl-1H-pyrazol-4-yl)methyl]piperidin-4-yl) benzamide (CXD101), or a pharmaceutically acceptable salt thereof.

2. The method of claim 1, wherein the N-(2-aminophenyl)-4-(1-[(1,3-dimethyl-1H-pyrazol-4-yl)methyl]piperidin-4-yl)benzamide (CXD101) compound, or a pharmaceutically acceptable salt or solvate thereof, is administered simultaneously, separately or sequentially with an immune checkpoint inhibitor.

3. The method of claim 2, wherein the immune checkpoint inhibitor is selected from a PD1, PD-L1 inhibitor, a LAG3 inhibitor and a CTLA-4 inhibitor.

4. The method of claim 2, wherein the immune checkpoint inhibitor is selected from a PD1 and PD-L1 inhibitor.

5. The method of claim 2, wherein the immune checkpoint inhibitor is selected from BMS-986016/Relatlimab, TSR-033, REGN3767, MGD013 (bispecific DART binding PD-1 and LAG-3), GSK2831781, LAG525, MDX-010/Ipilimumab, AGEN1884, CP 675,206/Tremelimumab, pembrolizumab, nivolumab, atezolizumab, avelumab and durvalumab, or a pharmaceutically acceptable salt or solvate thereof.

6. The method of claim 2, wherein the immune checkpoint inhibitor is selected from pembrolizumab, nivolumab, atezolizumab, avelumab and durvalumab, or a pharmaceutically acceptable salt or solvate thereof.

7. The method of claim 2, wherein the immune checkpoint inhibitor is selected from pembrolizumab and nivolumab, or a pharmaceutically acceptable salt or solvate thereof.

8. The method of claim 1, wherein N-(2-aminophenyl)-4-(1-[(1,3-dimethyl-1H-pyrazol-4-yl)methyl]piperidin-4-yl)benzamide (CXD101), or a pharmaceutically acceptable salt or solvate thereof, is administered at dosage of 20 mg to 40 mg per day.

9. The method of claim 1, wherein N-(2-aminophenyl)-4-(1-[(1,3-dimethyl-1H-pyrazol-4-yl)methyl]piperidin-4-yl)benzamide (CXD101), or a pharmaceutically acceptable salt or solvate thereof, is administered at dosage of 10 to 20 mg twice a day.

10. The method of claim 1, wherein N-(2-aminophenyl)-4-(1-[(1,3-dimethyl-1H-pyrazol-4-yl)methyl]piperidin-4-yl)benzamide (CXD101), or a pharmaceutically acceptable salt or solvate thereof, is administered at a dosing schedule of 2 to 8 consecutive days in a two or three week period and the dosing schedule is optionally repeated.

11. The method of claim 1, wherein N-(2-aminophenyl)-4-(1-[(1,3-dimethyl-1H-pyrazol-4-yl)methyl]piperidin-4-yl)benzamide (CXD101), or a pharmaceutically acceptable salt or solvate thereof, is administered at a dosing schedule of 5 consecutive days in a two or three week period and the dosing schedule is optionally repeated.

12. The method of claim 1, wherein immune checkpoint inhibitor-induced colitis is treated by inducing neutropenia.

13. The method of claim 1, wherein the N-(2-aminophenyl)-4-(1-[(1,3-dimethyl-1H-pyrazol-4-yl)methyl]piperidin-4-yl)benzamide (CXD101) compound, or a pharmaceutically acceptable salt or solvate thereof, is administered simultaneously, separately or sequentially with an immune checkpoint inhibitor; and N-(2-aminophenyl)-4-(1-[(1,3-dimethyl-1H-pyrazol-4-yl)methyl]piperidin-4-yl)benzamide (CXD101), or a pharmaceutically acceptable salt or solvate thereof, is administered at dosage of 20 mg to 40 mg per day.

14. The method of claim 13, wherein the immune checkpoint inhibitor is selected from a PD1 and PD-L1 inhibitor.

15. The method of claim 13, wherein the immune checkpoint inhibitor is selected from pembrolizumab and nivolumab, or a pharmaceutically acceptable salt or solvate thereof.

16. The method of claim 1, wherein the N-(2-aminophenyl)-4-(1-[(1,3-dimethyl-1H-pyrazol-4-yl)methyl]piperidin-4-yl)benzamide (CXD101) compound, or a pharmaceutically acceptable salt or solvate thereof, is administered simultaneously, separately or sequentially with an immune checkpoint inhibitor; and N-(2-aminophenyl)-4-(1-[(1,3-dimethyl-1H-pyrazol-4-yl)methyl]piperidin-4-yl)benzamide (CXD101), or a pharmaceutically acceptable salt or solvate thereof, is administered at a dosing schedule of 2 to 8 consecutive days in a two or three week period and the dosing schedule is optionally repeated.

17. The method of claim 16, wherein the immune checkpoint inhibitor is selected from a PD1 and PD-L1 inhibitor.

18. The method of claim 16, wherein the immune checkpoint inhibitor is selected from pembrolizumab and nivolumab, or a pharmaceutically acceptable salt or solvate thereof.

19. A method of treating a proliferative disorder and of treating immune checkpoint inhibitor-induced colitis in a subject in need thereof, the method comprising administering to said subject a combination comprising N-(2-aminophenyl)-4-(1-[(1,3-dimethyl-1H-pyrazol-4-yl)methyl]piperidin-4-yl)benzamide (CXD101), or a pharmaceutically acceptable salt thereof, and an immune checkpoint inhibitor, or a pharmaceutically acceptable salt thereof.

* * * * *